United States Patent
Qasim et al.

(10) Patent No.: US 12,181,094 B2
(45) Date of Patent: Dec. 31, 2024

(54) COMPLETION PLUG AND FITTING

(71) Applicant: Mueller International, LLC, Atlanta, GA (US)

(72) Inventors: Mohammad Unnus Qasim, Decatur, IL (US); Timothy Wayne Stern, Hixon, TN (US)

(73) Assignee: Mueller International, LLC, Atlanta, GA (US)

( * ) Notice: Subject to any disclaimer, the term of this patent is extended or adjusted under 35 U.S.C. 154(b) by 86 days.

(21) Appl. No.: 17/474,123

(22) Filed: Sep. 14, 2021

(65) Prior Publication Data
US 2023/0082831 A1 Mar. 16, 2023

(51) Int. Cl.
*F16L 55/11* (2006.01)

(52) U.S. Cl.
CPC ................. *F16L 55/1125* (2013.01)

(58) Field of Classification Search
CPC ....... E02D 29/1427; E05C 9/045; F16J 13/00; F16J 13/02; F16J 13/08; F16L 55/11; F16L 55/136; Y10T 292/084; Y10T 292/0845; Y10T 292/1005; Y10T 292/71
See application file for complete search history.

(56) References Cited

U.S. PATENT DOCUMENTS

| | | | | |
|---|---|---|---|---|
| 1,830,949 A * | 11/1931 | Lake | ..................... | B65D 90/626 292/37 |
| 2,446,732 A * | 8/1948 | Whittall | .................... | E05G 1/00 109/59 R |
| 3,155,116 A * | 11/1964 | Ver Nooy | ............... | F16L 41/04 292/37 |
| 3,435,794 A * | 4/1969 | Pechacek | ................... | B01J 3/03 49/246 |
| 3,792,884 A * | 2/1974 | Tutikawa | ................ | E05C 9/047 292/179 |
| 3,931,670 A * | 1/1976 | Arnold | ....................... | F16L 1/26 405/170 |
| 4,188,675 A * | 2/1980 | Ast | ....................... | F16L 55/136 215/358 |
| 4,387,740 A * | 6/1983 | Vanzant | ................ | F16L 55/128 292/49 |
| 4,559,880 A * | 12/1985 | Lacka | ....................... | E05G 1/00 109/51 |
| 4,609,209 A * | 9/1986 | Ralls | ....................... | F16L 55/136 285/365 |
| 4,693,278 A * | 9/1987 | Wilson | ....................... | F16J 13/10 220/203.27 |
| 5,171,514 A * | 12/1992 | Veronesi | ................ | F22B 37/222 138/89 |

(Continued)

*Primary Examiner* — David R Deal
(74) *Attorney, Agent, or Firm* — Taylor English Duma LLP

(57) ABSTRACT

A plug can include a body defining a top body end and a bottom body end, the body defining an outer surface extending between the top body end and the bottom body end and a plug recess extending into the body from the outer surface; and a locking mechanism including a locking bar, the locking bar rotationally fixed relative to the body, the locking mechanism reconfigurable between a locked configuration and an unlocked configuration, the locking bar positioned at least partially within the plug recess, at least a portion of the locking bar extending outward from the plug recess in the locked configuration.

8 Claims, 26 Drawing Sheets

(56) References Cited

U.S. PATENT DOCUMENTS

| | | | |
|---|---|---|---|
| 6,286,553 B1* | 9/2001 | Morgan | F16J 13/24 |
| | | | 220/323 |
| 7,913,717 B2* | 3/2011 | Khasanov | F16J 13/18 |
| | | | 138/92 |
| 8,001,988 B2 | 8/2011 | Wilson et al. | |
| 2005/0121091 A1* | 6/2005 | Sayers | F16L 47/34 |
| | | | 138/89 |

* cited by examiner

COMPLETION PLUG AND FITTING

TECHNICAL FIELD

This disclosure relates to plugs and fittings for a pipeline. More specifically, this disclosure relates to completion plugs and fittings.

BACKGROUND

Pipelines often have extra flanged fittings that are plugged and not utilized during normal operation of the pipeline. The extra flanged fittings are often installed for past or future purposes, such as for repair, infrastructure expansion, temporary diversion, or other purposes. For example, during repair of a pipeline, a temporary valve may be installed in the pipeline upstream of the area to be repaired, or both upstream and downstream of the area to be repaired. These temporary valves can leave behind fittings permanently installed on the pipeline, which are typically plugged and covered with a blind flange after completion of the repair.

During repair operations, a flanged fitting is attached to the existing pipeline, such as by clamping or welding the fitting to the pipeline. A gate valve, such as a knife valve, is then fastened to the flange. A drilling machine with a shell cutter positioned in a compartment is then fastened to the valve to seal the compartment with the valve. The valve is then opening, and the shell cutter advances and cuts through the pipeline, thereby allowing fluid to fill the compartment. The shell cutter is then retracted back through the valve, and the valve is sealed to isolate the compartment from the pipeline. Commonly, the shell cutter also withdraws the cut-out portion of the pipeline, which is often called a coupon, when the shell cutter is retracted. Once the valve is sealed, the drilling machine can either be replaced with a separate machine including a stopper plug or the drilling machine can be refit, such as with a stopper plug in the compartment. The valve can then be reopened, and the stopper plug can be inserted through the valve into the pipeline to stop flow through the pipeline. Once repairs on the pipeline are completed, the stopper plug can be removed through the valve to resume flow through the pipeline, and the valve can then be closed to isolate the compartment from the pipeline. The drilling machine can be replaced with another machine including a completion plug or refit with a completion plug in the compartment. The valve can be opened, and the completion plug can be inserted into the fitting to seal the flange. The machine can then be withdrawn through the valve, and both the machine and the valve can be removed from the flange. Commonly, a blind flange is bolted over the completion plug as a redundant measure to prevent leaks and tampering.

These fittings are commonly sealed with a plug, and then a blind flange is fastened over the plug. The plugs are frequently threaded into the fittings themselves, which can cause long-term issues with corrosion and sealing. For example, the plug may rust within the fitting and become difficult to remove. Screwing the plugs into the plug fittings can also be time-consuming, particularly for large-bore plugs and fittings. Additionally, if the plug is not inserted into the fitting correctly and is then screwed into the fitting, sometimes called "cross-threading," the threading of the permanently-mounted fitting can be damaged. If the fitting is damaged, the repair effort can become substantially more complicated, expensive, and time consuming.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a plug comprising a body defining a top body end and a bottom body end, the body defining an outer surface extending between the top body end and the bottom body end and a plug recess extending into the body from the outer surface; and a locking mechanism comprising a locking bar, the locking bar rotationally fixed relative to the body, the locking mechanism reconfigurable between a locked configuration and an unlocked configuration, the locking bar positioned at least partially within the plug recess, at least a portion of the locking bar extending outward from the plug recess in the locked configuration.

Also disclosed is a system comprising a fitting defining a bore and a fitting recess; a plug positioned within the bore, the plug comprising a body, the body defining a plug recess; and a locking mechanism comprising a locking bar, the locking bar engaging each of the fitting recess and the plug recess when the locking mechanism is in a locked configuration, the locking bar engaging only one of the fitting recess and the plug recess when the locking mechanism is in an unlocked configuration, the locking bar translatable relative to the body to reconfigure the locking mechanism between the locked configuration and the unlocked configuration.

Also disclosed is a method of sealing a bore of a fitting with a plug, the method comprising inserting the plug into the bore of the fitting, the fitting defining a fitting recess within the bore, the plug defining a plug recess; and translating a locking bar of a locking mechanism to engage the locking bar with the fitting recess and the plug recess and secure the plug within the bore.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
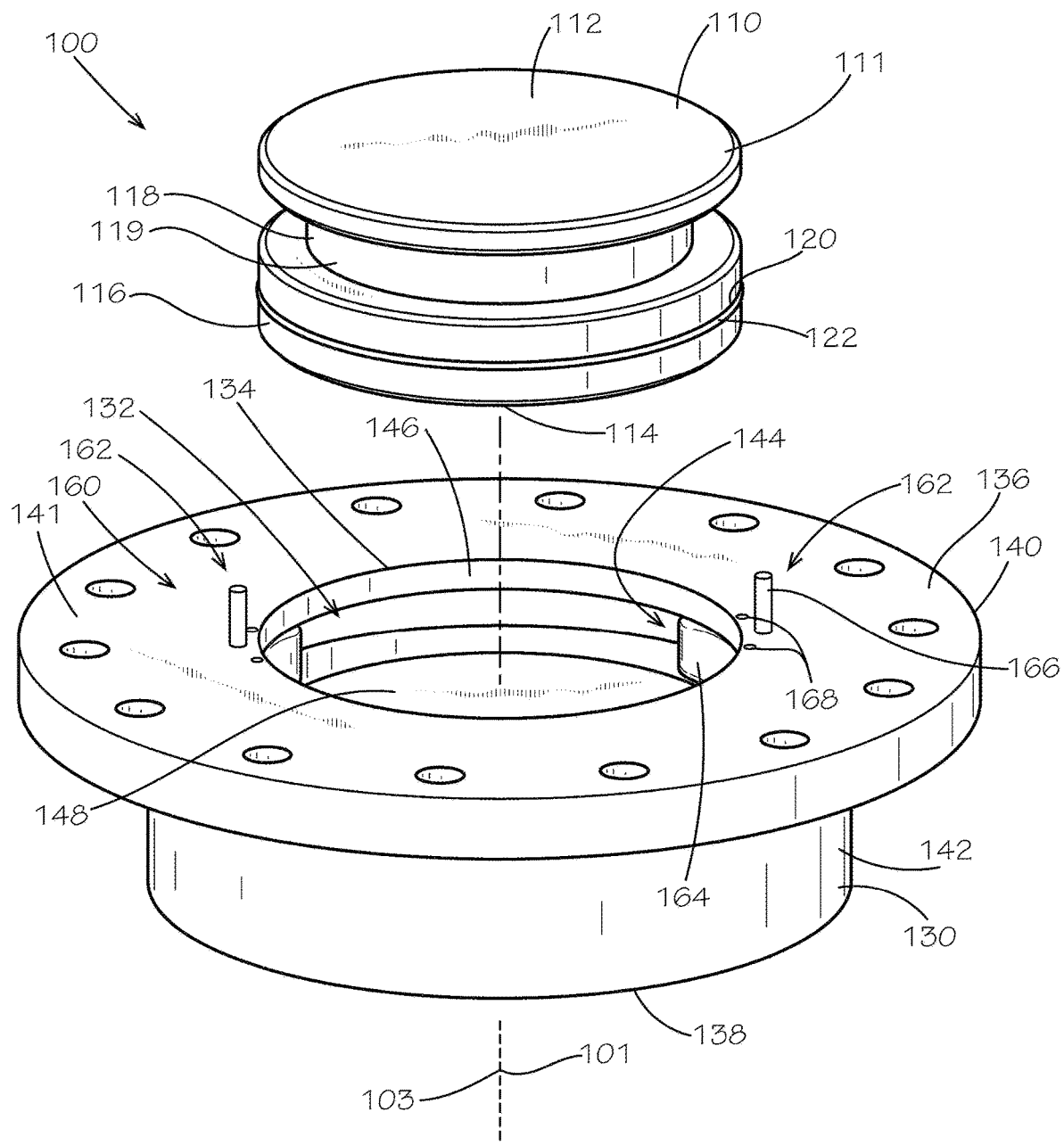
FIG. 1 is a perspective view of a completion plug and fitting system ("the system") comprising a completion plug, a fitting, and a locking mechanism in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a completion plug and fitting system and associated methods, systems, devices, and various apparatus. The completion plug and fitting system can comprise a fitting, a plug, and a locking mechanism. In the aspect of the completion plug and fitting system shown in FIGS. 1-9, the locking mechanism can be integrated into the fitting. In the aspects of the completion plug and fitting system shown in FIGS. 10-24, the locking mechanism can be integrated into the plug. It would be understood by one of skill in the art that the disclosed completion plug and fitting system is described in but a few exemplary aspects among many. No particular terminology or description should be considered limiting on the disclosure or the scope of any claims issuing therefrom.

FIG. 1 is a perspective view of a completion plug and fitting system 100 (referred to as "the system 100" hereafter) comprising a completion plug 110 (referred to as "the plug 110" hereafter), a fitting 130, and a locking mechanism 160 in accordance with one aspect of the present disclosure. The system 100 is shown in an open configuration. In the open configuration, the plug 110 can be positioned external to a bore 132 of the fitting 130. In the open configuration, an opening 134 of the bore 132 can be open and unobstructed by the plug 110.

The plug 110 can comprise a body 111 and a sealing member 122. The body 111 can define a top body end 112 and a bottom body end 114. The bottom body end 114 can be positioned opposite from the top body end 112. The body 111 can define an outer surface 116 extending between the top body end 112 and the bottom body end 114.

At least portions of the outer surface 116 can be cylindrical and centered about a plug axis 101 of the plug 110. In the present aspect, the outer surface 116 can be substantially cylindrical, such as to say the outer surface 116 can be cylindrical with the exception of a plug recess 118, a sealing groove 120, and/or transition surfaces at the body ends 112,114, such as chamfers, fillets, or other transition profiles, for example and without limitation. The plug recess 118 can extend radially inward from the outer surface 116 to an inner plug recess surface 119 with respect to the plug axis 101. In the present aspect, the plug recess 118 can extend circumferentially around the body 111. In the present aspect, the plug recess 118 can extend entirely around the circumference of the body 111 in the form of a groove. In some aspects, the plug recess 118 can comprise multiple separate depressions, such as blind pockets or holes for example and without limitation, which can be spaced circumferentially around the body 111.

The sealing groove 120 can extend inward from the outer surface 116 with respect to the plug axis 101. The sealing groove 120 can extend circumferentially around the body 111. The sealing groove 120 can receive the sealing member 122. In the present aspect, the sealing member 122 can be an O-ring. In some aspects, the sealing member 122 can be a washer, such as a rubber washer for example and without limitation, or any other suitable type of seal.

The fitting 130 can define a first fitting end 136 and a second fitting end 138. The fitting 130 can be a standalone fitting, such as a flangeolet or weld neck flange, which can be configured to be welded directly to a pipeline or other component, or the fitting 130 can be a flanged portion of a larger fitting, such as a tapping sleeve, such as the H-304, H-306, H-619, or H-619 sold by Mueller Co. LLC of Chattanooga, Tennessee, for example and without limitation. In applications wherein the fitting 130 represents a flanged portion of a larger fitting, the second fitting end 138 may represent an end of a flanged portion rather than an opposite end of the larger fitting overall. The first fitting end 136 can be positioned opposite from the second fitting end 138. A flange 140 of the fitting 130 can define the first fitting end 136, and a neck 142 of the fitting 130 can define the second fitting end 138.

The flange 140 can define a flange face 141 at the first fitting end 136. The bore 132 can extend from the first fitting end 136 to the second fitting end 138. An intersection of the bore 132 with the flange face 141 can define the opening 134 of the bore 132. The bore 132 can define a fitting axis 103. In the aspect shown, the plug 110 can be aligned with the opening 134 of the bore 132, and the axes 101,103 can be coincident.

A fitting recess 144 can extend radially outward from the bore 132 and into the fitting 130 with respect to the fitting axis 103. The flange 140 can define an upper portion 146 of the bore 132 between the first fitting end 136 and the fitting recess 144. The neck 142 and/or the flange 140 can define a lower portion 148 of the bore 132 between the fitting recess 144 and the second fitting end 138. In the present aspect, the fitting recess 144 can extend circumferentially around the bore 132. In the present aspect, the fitting recess 144 can extend entirely around the circumference of the bore 132 in the form of a groove. In some aspects, the fitting recess 144 can comprise multiple separate depressions, which can be spaced circumferentially around the bore 132.

In the present aspect, the locking mechanism 160 can be integrated with the fitting 130. The locking mechanism 160 can comprise at least one locking bar assembly 162, which can comprise a locking bar 164, and one or more driving members, such as at least one locking pin 166 and/or at least one releasing pin 168, for example and without limitation. In the aspect shown, the locking mechanism 160 can comprise two locking bar assemblies 162; however, in other aspects, the locking mechanism 160 can comprise greater or fewer than two locking bar assemblies 162. The locking bar assemblies 162 can be independently actuated between an unlocked configuration (shown in FIG. 1) and a locked configuration (shown in FIGS. 8 and 9). With each of the locking bar assemblies 162 positioned in the locked configuration, the locking mechanism 160 can be in a locked configuration as well. With each of the locking bar assemblies 162 positioned in the unlocked configuration, the locking mechanism 160 can be in an unlocked configuration as well. The plug 110 can be inserted into or removed from the bore 132 through the opening 134 by lowering the plug 110 along the fitting axis 103.

Figure 2:
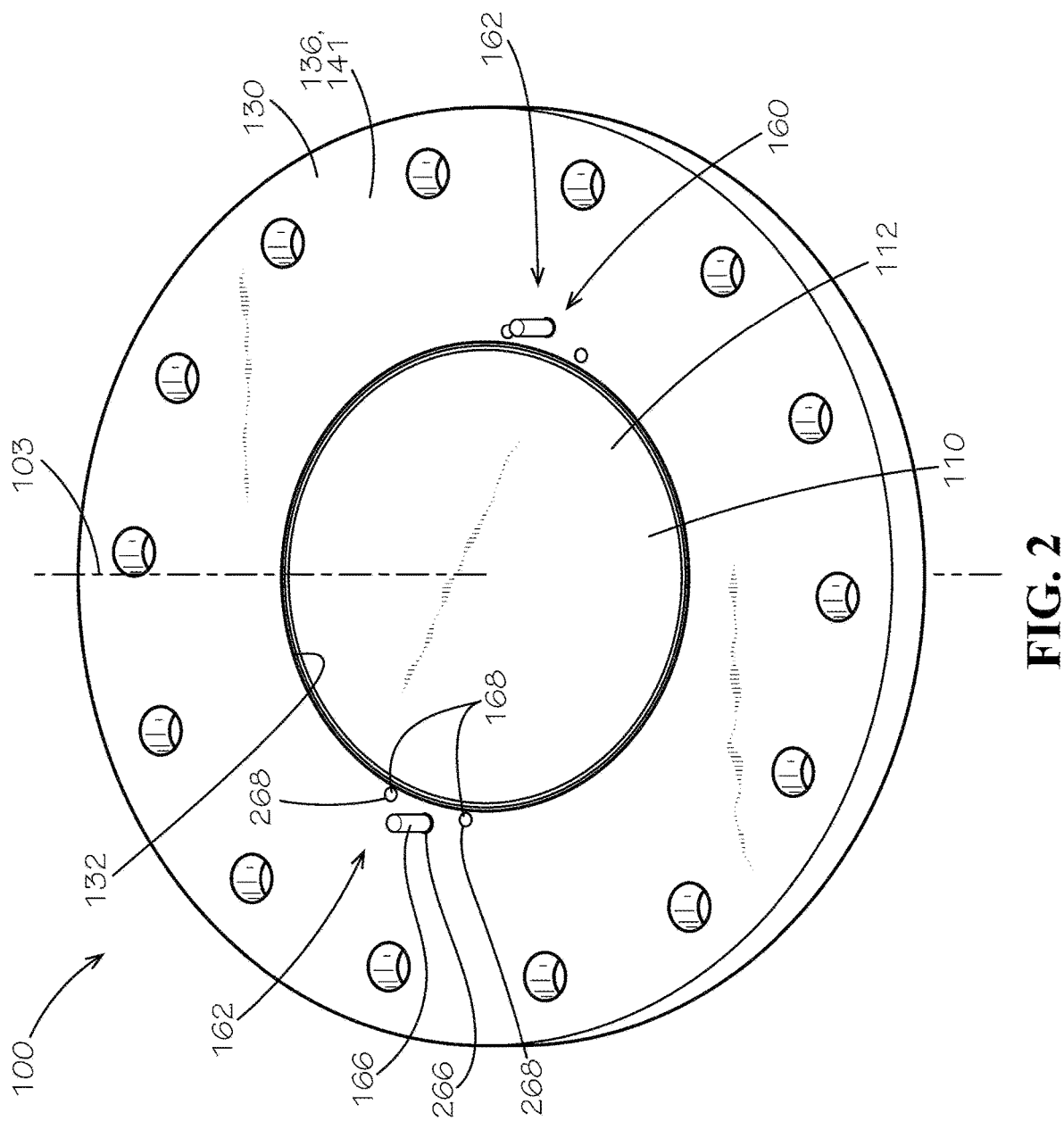
FIG. 2 is a top perspective view of the system of FIG. 1 with the plug positioned within a bore of the fitting and the locking mechanism positioned in an unlocked configuration.

FIG. 2 is a perspective view of the system 100 with the plug 110 inserted into the bore 132 of the fitting 130 in a sealing position of the plug 110 with the locking mechanism 160 in the unlocked configuration. In the present aspect, the top body end 112 can be positioned flush with flange face 141 at the first fitting end 136 in the sealing position of the plug 110. In other aspects, the top body end 112 can be recessed below or protrude above the flange face 141 in the sealing position.

The locking pin 166 can be received in a locking pin hole 266 of the fitting 130. The releasing pins 168 can be received in respective releasing pin holes 268 of the fitting 130. The pin holes 266,268 can extend into the flange face 141 parallel to the fitting axis 103.

When the locking mechanism 160 is in the unlocked configuration, each of the locking bar assemblies 162 can be in the unlocked configuration, as referenced above. In the unlocked configuration, the locking pin 166 can extend outwards from the locking pin hole 266 and can protrude outwards from the flange face 141 in an extended position. In the unlocked configuration, the releasing pins 168 can be flush with or recessed below the flange face 141 in the respective releasing pin holes 268 in a recessed position.

Figure 3:
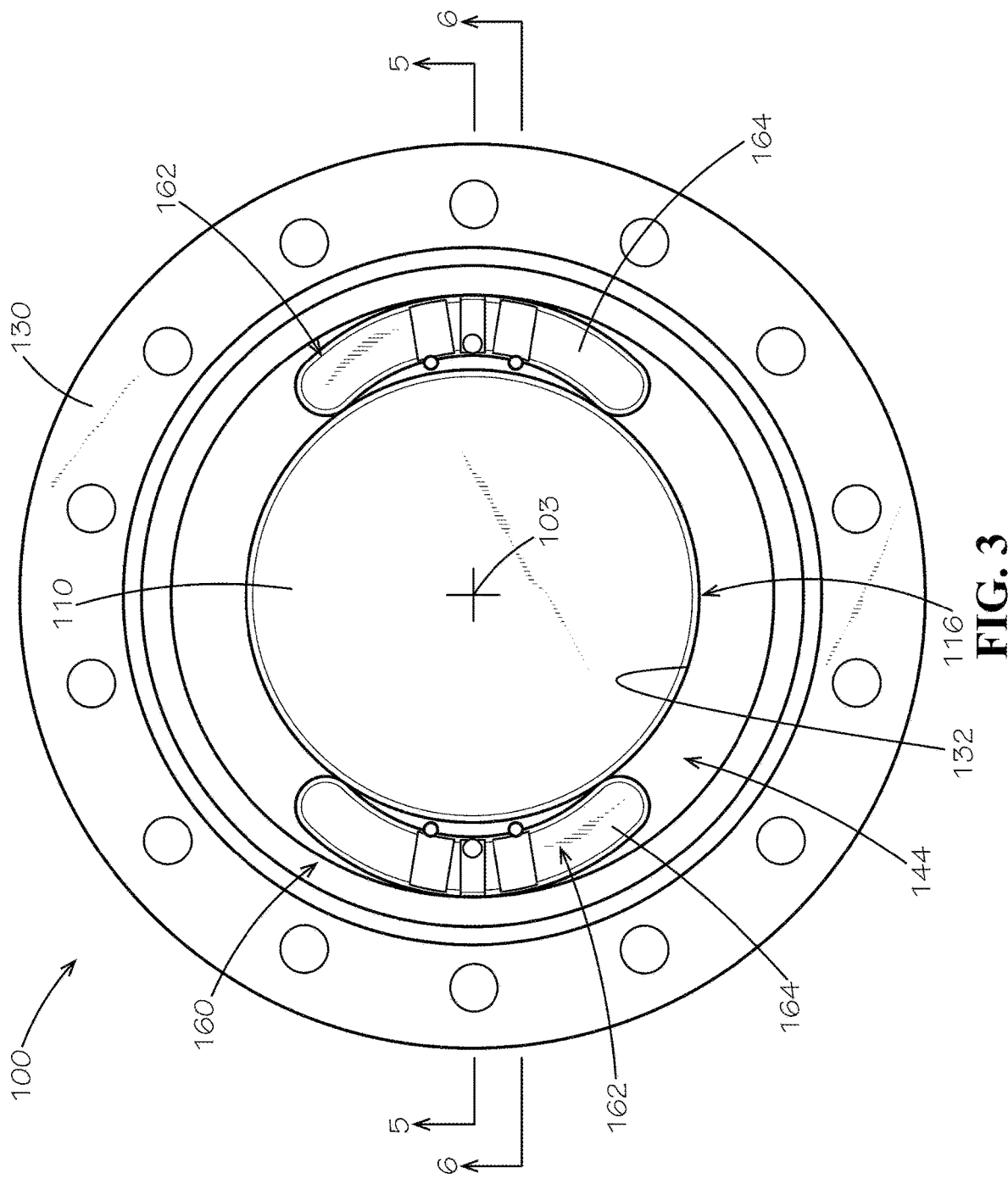
FIG. 3 is a top view of the system of FIG. 1 with the plug positioned within the bore of the fitting (shown in transparency) and the locking mechanism positioned in an unlocked configuration.

FIG. 3 is a top view of the system 100 with the plug 110 inserted into the bore 132 of the fitting 130 in the sealing position of the plug 110 with the locking mechanism 160 in the unlocked configuration. In the unlocked configuration, the locking bars 164 of the locking bar assemblies 162 can be positioned radially outward from the outer surface 116 with respect to the fitting axis 103, such that the locking bars 164 can be disengaged from the plug recess 118 (shown in FIG. 1), which can be an unlocked position of the locking bars 164. The locking bars 164 can be disposed within the fitting recess 144, such that the locking bars 164 can be wholly positioned flush with or radially outward from the bore 132 with respect to the fitting axis 103.

Figure 4:
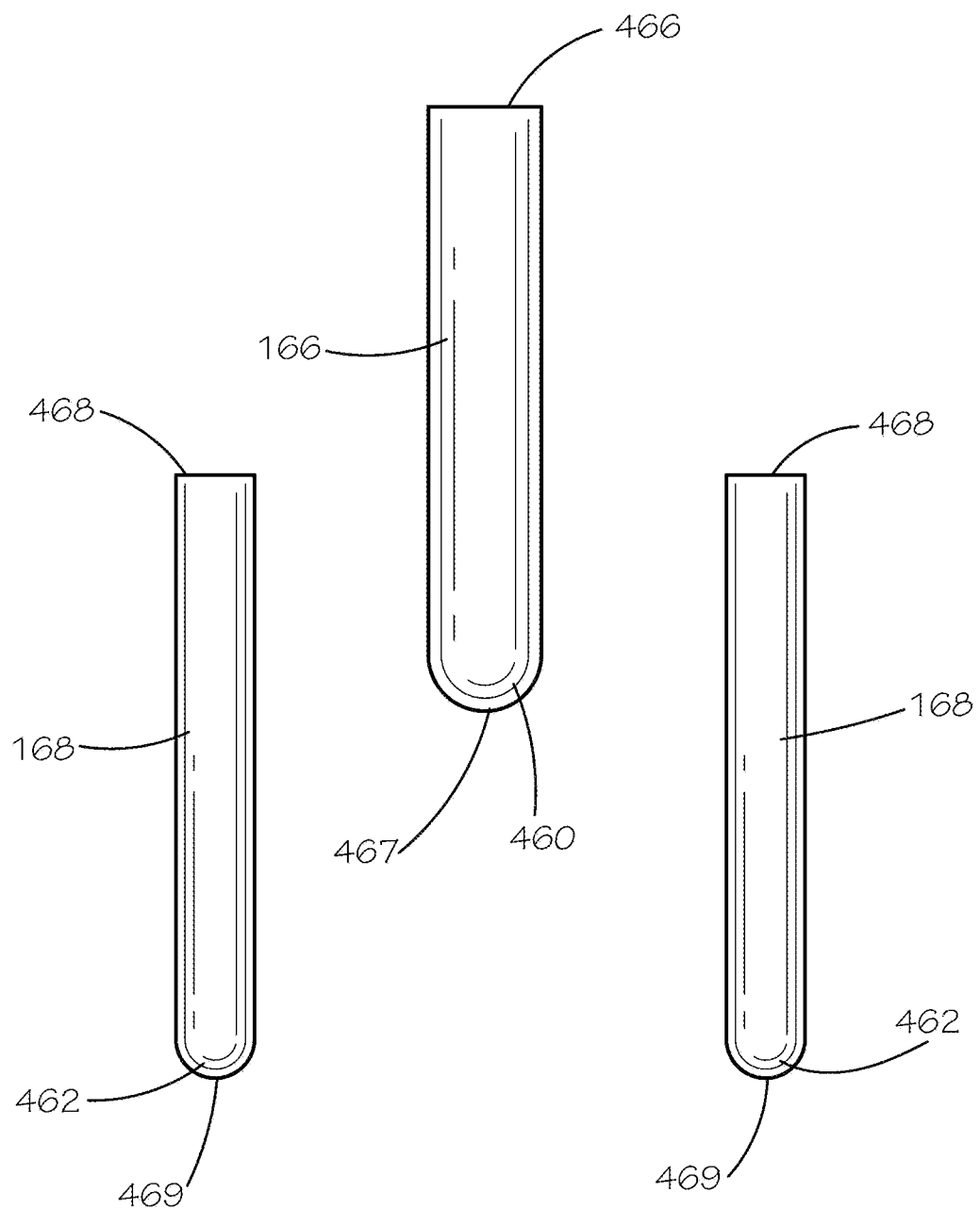
FIG. 4 is front view of a locking pin and a pair of releasing pins of the locking mechanism of the system of FIG. 1.

FIG. 4 is a front view of the locking pin 166 and the releasing pins 168 of one of the locking bar assemblies 162 of the locking mechanism 160 (shown in FIG. 1), shown in their relative positions for the unlocked configuration. The pins 166,168 can respectively define top ends 466,468 and bottom ends 467,469. The bottom ends 467,469 can each define a contoured surface 460,462. In the present aspect, some or all of the pins 166,168 can define a circular cross-section. Some or all of the contoured surfaces 460,462 can be rounded, such as being shaped as a hemisphere, a dome, a cylindrical segment, a cone, a frustum, or any other suitable shape. In other aspects, the contoured surfaces 460,462 can define flattened surfaces, such as a bevel, chamfer, pyramid, or other suitable shape.

The contoured surfaces 460,462 can be configured to smoothly slide over a locking ramp 566 (shown in FIG. 5) and a pair of releasing ramps 568 (shown in FIGS. 5 and 6), respectively, without binding, gouging, or otherwise catching upon the respective ramps 566,568.

Figure 5:
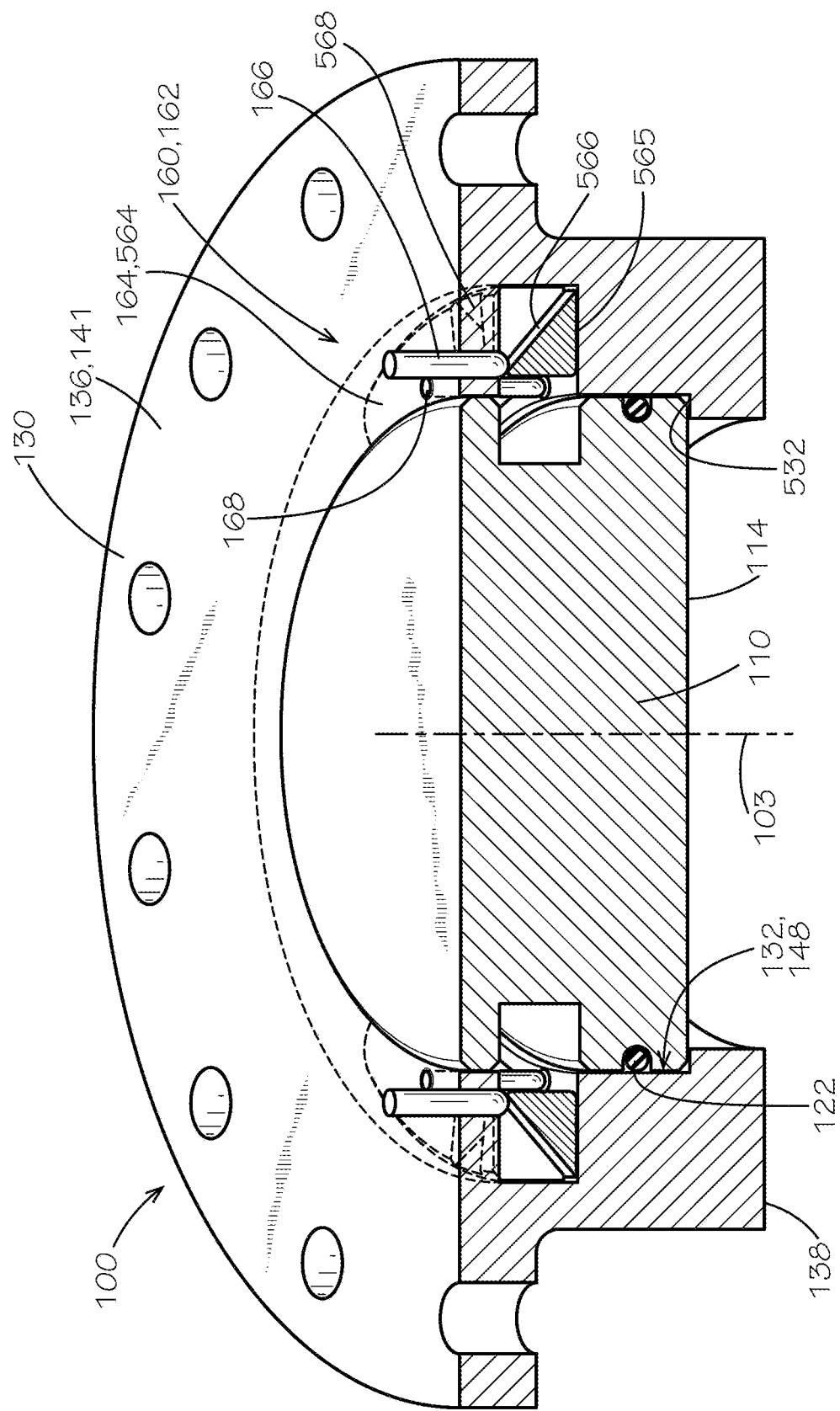
FIG. 5 is a cross-sectional view of the system of FIG. 1 taken along line 5-5, shown in FIG. 3, with the locking mechanism in the unlocked configuration.

Turning to FIG. 5, a cross-sectional view of the system 100 is shown, taken along Line 5-5 of FIG. 3, with the plug 110 inserted into the bore 132 of the fitting 130 in the sealing position of the plug 110 with the locking mechanism 160 in the unlocked configuration.

The fitting 130 can define a shoulder 532, which can extend radially inward from surrounding portions of the bore 132, with respect to the fitting axis 103. In the sealing position, the bottom body end 114 can rest upon the shoulder 532. The sealing member 122 can seal with the bore 132. In some aspects, the sealing member 122 can specifically seal with the lower portion 148 of the bore 132. In some aspects, the sealing member 122 or another sealing member can be positioned between the bottom body end 114 and the shoulder 532 to form a seal there between.

Figure 6:
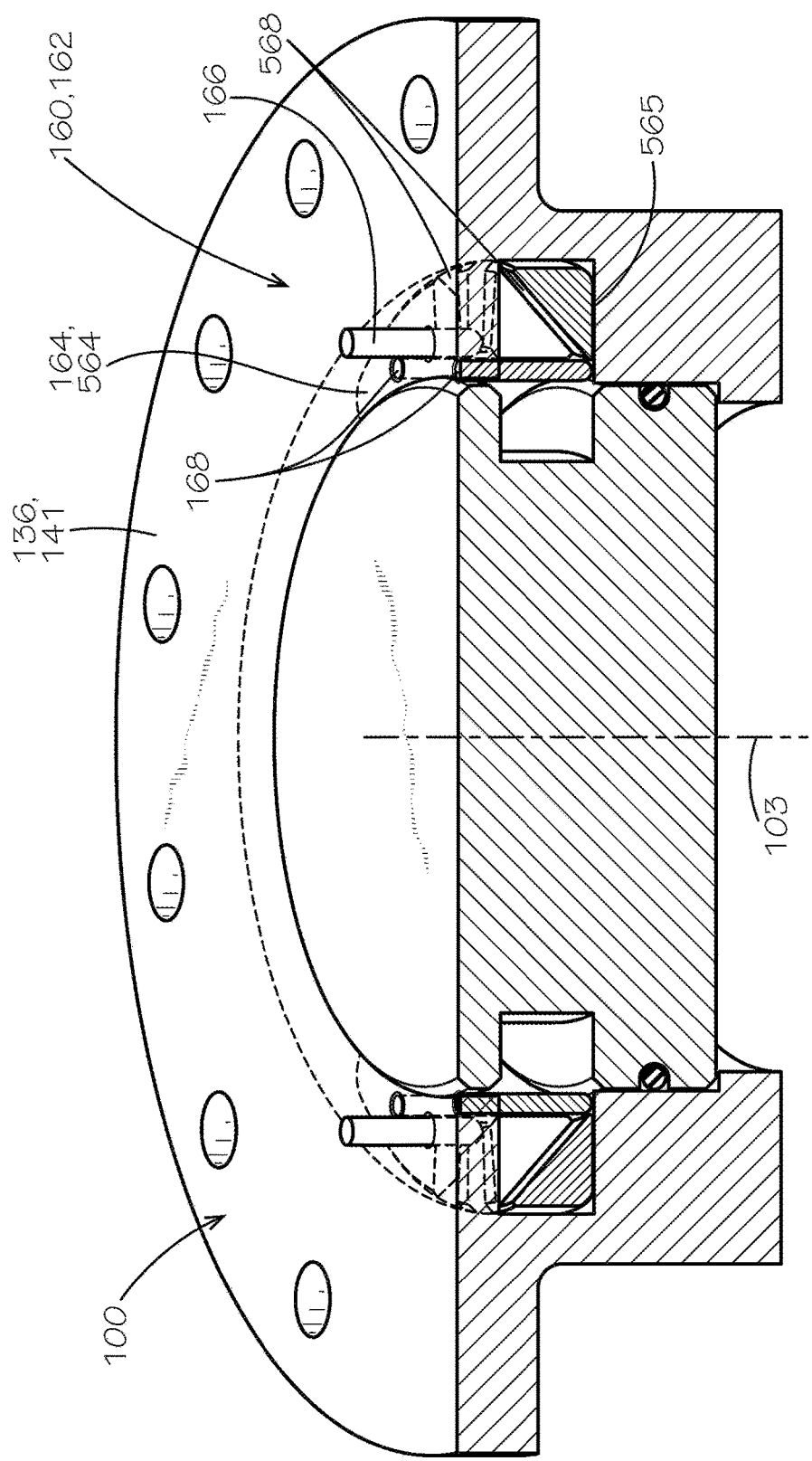
FIG. 6 is a cross-sectional view of the system of FIG. 1 taken along line 6-6, shown in FIG. 3, with the locking mechanism in the unlocked configuration.

FIGS. 5 and 6 show the locking ramp 566 (shown in FIG. 5) and releasing ramps 568 (shown in FIGS. 5 and 6). As demonstrated by the right locking bar assembly 162 (with respect to the present viewing angle) of the locking mechanism 160, the locking bars 164 can define a top locking bar end 564 and a bottom locking bar end 565. The locking ramp 566 can face radially outwards with respect to the fitting axis 103. The locking ramp 566 can extend radially outward with respect to the fitting axis 103 as it slopes downwards from the top locking bar end 564 towards the bottom locking bar end 565.

The releasing ramp 568 can face radially inwards with respect to the fitting axis 103. The releasing ramp 568 can extend radially inwards with respect to the fitting axis 103 as it slopes downwards from the top locking bar end 564 towards the bottom locking bar end 565.

The locking pin 166 can extend through the flange face 141 of the first fitting end 136 to engage the locking ramp 566. The releasing pins 168 can extend through the flange face 141 of the first fitting end 136 to engage the releasing ramps 568.

As described below, the pins 166,168 can act as cams, such as linear cams, wherein movement of the pins 166, 168 in one direction can result in movement of the locking bars 164 in another direction. The pins 166,168 can be repositionable between a raised position, wherein the respective pins 166, 168 extend upwards from the flange face 141, and a recessed position, wherein the respective pins 166, 168 are flush with or positioned below the flange face 141.

Pressing the locking pin 166 downwards into the flange face 141 parallel to the fitting axis 103 can drive, or slide, the respective locking bar 164 radially inwards, with respect to the fitting axis 103, as the locking pin 166 slides down the locking ramp 566. More specifically, in some aspects, the locking bar 164 can translate between the locked and unlocked configurations. The translation can be in the geometric sense, wherein each locking bar 164 can slide without rotating, or otherwise changing orientation. In other words, a rotational orientation of the locking bar 164 in the unlocked configuration can be the same as the rotational orientation of the locking bar 164 in the locked configuration. In some aspects, the locking bar 164 can linearly translate in a radial direction that intersects the axis 103 to transition between the locked and unlocked configurations. Movement of the locking bars 164 radially inward with respect to the fitting axis 103 can position the locking bars 164, the locking bar assemblies 162, and the overall locking mechanism 160 in the locked configuration (shown in FIGS. 8 and 9).

Figure 7:
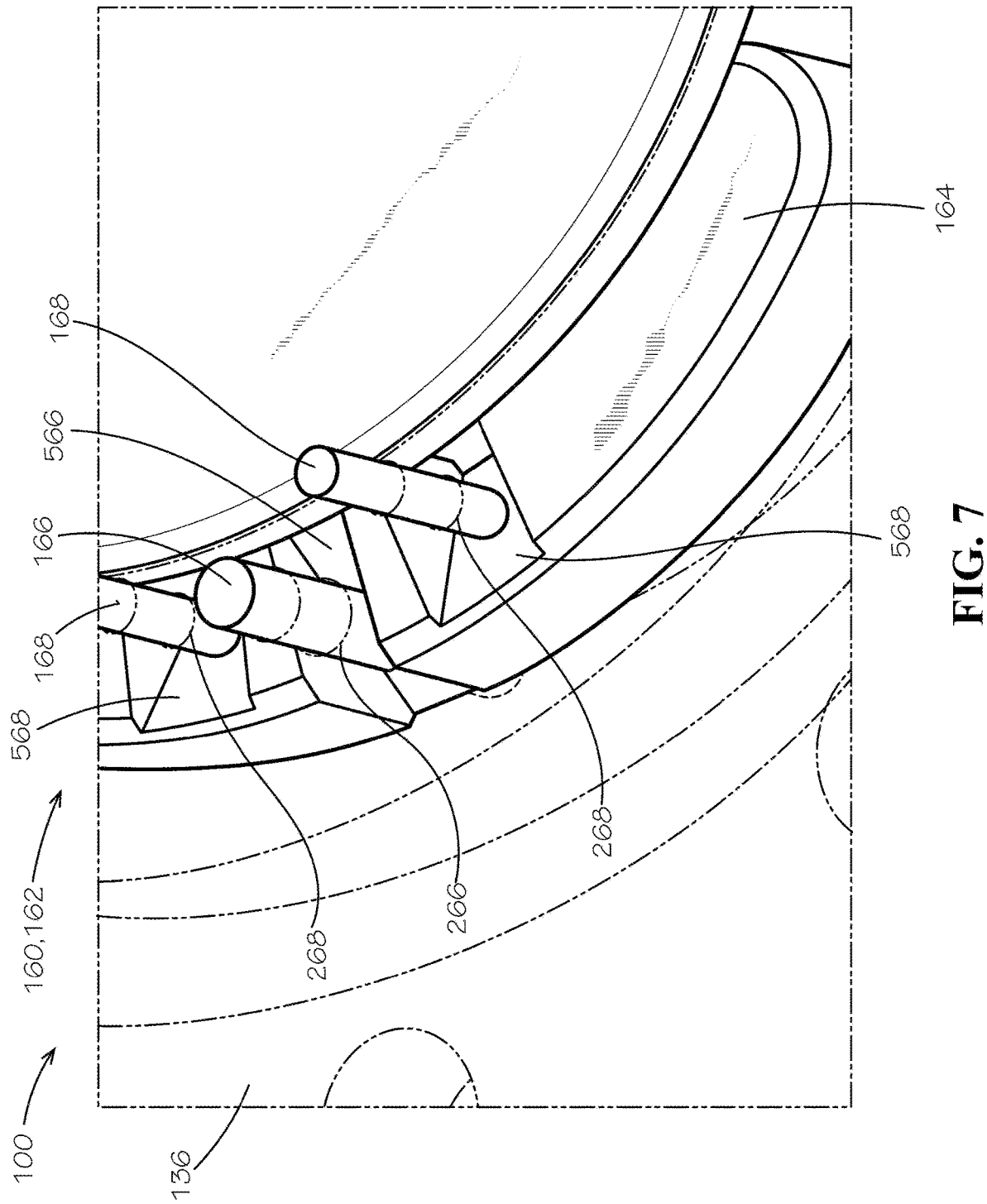
FIG. 7 is a detailed view of the system of FIG. 1 with the fitting shown in transparency and the locking mechanism partially reconfigured from the unlocked configuration to a locked configuration.

As demonstrated by FIG. 7, which shows one of the locking bars 164 of one of the locking bar assemblies 162 of the locking mechanism 160 positioned between the unlocked configuration and the locked configuration, radially inward movement of the locking bars 164 with respect to the fitting axis 103 (shown in FIG. 6) can cause the releasing pins 168 to raise upwards from the flange face 141 (shown in FIG. 6, flange face 141 is shown in transparency in FIG. 7) parallel to the fitting axis 103 due to engagement between the releasing pins 168 and the releasing ramps 568. Therefore, in some aspects, movement of the locking bars 164 in the radial direction with respect to the fitting axis 103 can result in the locking pin 166 and the releasing pins 168 travelling parallel to the fitting axis 103 in opposite directions from one another. When the locking bar 164 is positioned between the locked configuration and the unlocked configuration, both the locking pin 166 and the releasing pins 168 can extend partially outwards from the respective pin holes 266,268 and upwards from the flange face 141.

Figure 8:
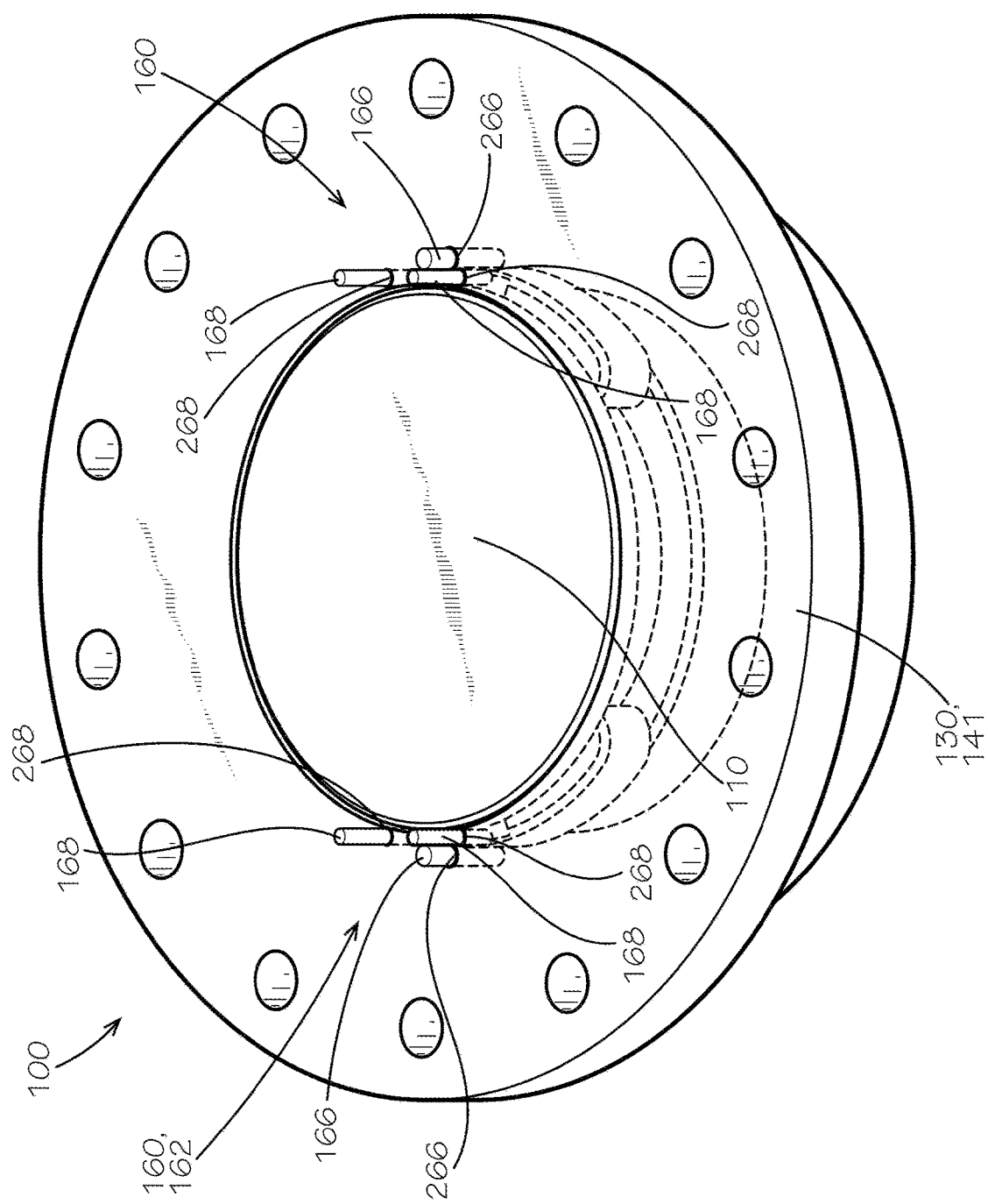
FIG. 8 is a top perspective view of the system of FIG. 1 with the plug positioned within the bore of the fitting (shown in transparency) and the locking mechanism positioned in the locked configuration.
Figure 9:
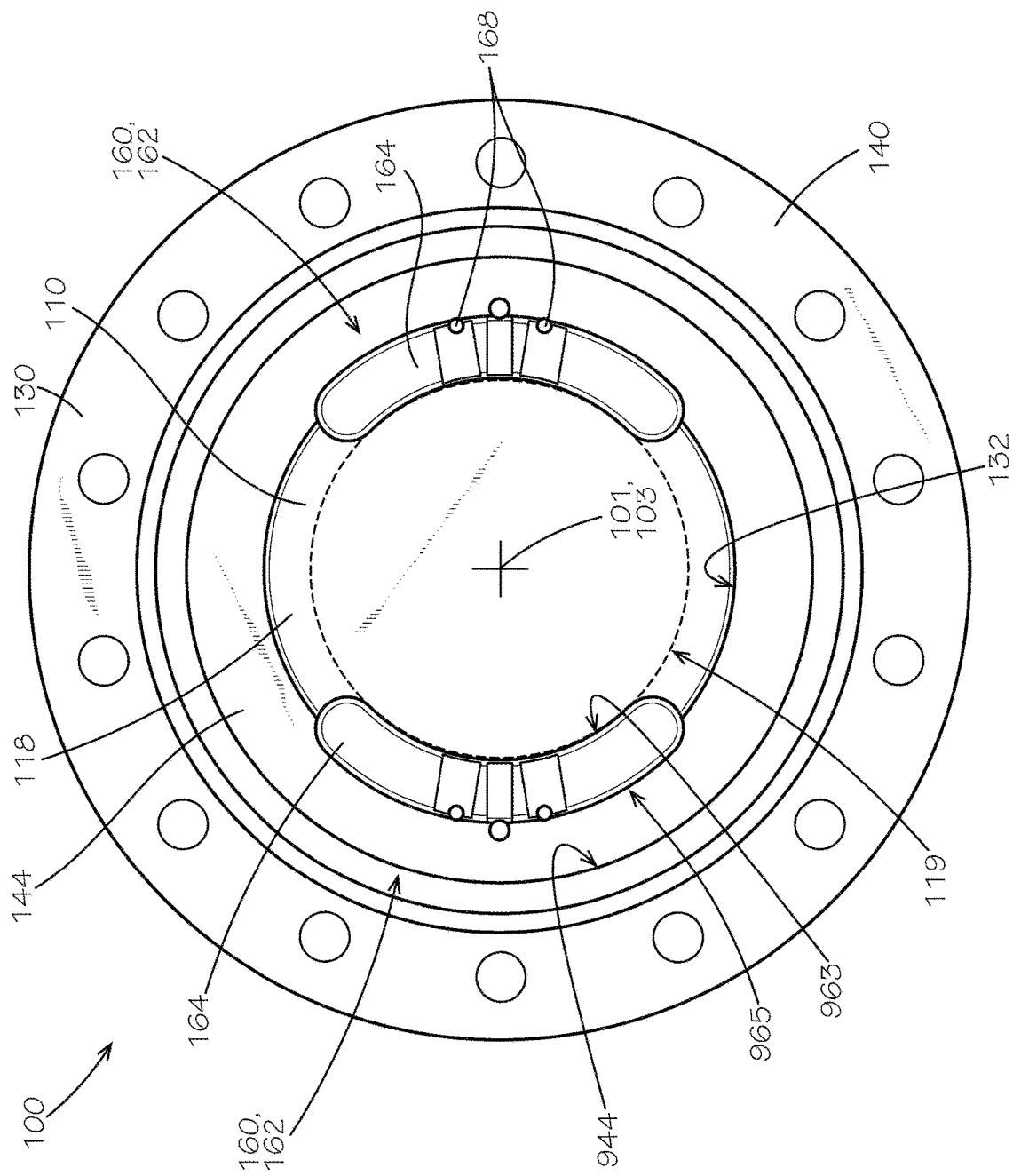
FIG. 9 is a top view of the system of FIG. 1 with the plug positioned within the bore of the fitting (shown in transparency) and the locking mechanism positioned in the locked configuration.

FIGS. 8 and 9 demonstrate the locking bar 164 of each locking bar assembly 162 and the overall locking mechanism 160 in the locked configuration. Referring to FIG. 8, the releasing pins 168 can be in the extended position, wherein the releasing pins 168 can extend outwards from their respective releasing pin holes 268 and can protrude outwards from the flange face 141 in the locked configuration. The locking pin 166 can be in the recessed position, wherein the locking pin 166 can be flush with or recessed below the flange face 141 in the locking pin hole 266 in the locked configuration.

In some aspects, the pins 166,168 can provide some indicia of the status of the locking mechanism 160. In some aspects, the indicia can define a color-coding scheme. The locking pin 166 can be red, and the releasing pins 168 can be green, for example and without limitation. Red, which is commonly associated with danger and hazards in industrial settings, can be used to show that when the locking pin 166 extends outwards from the locking pin hole 266 and is visible, the locking mechanism 160 can be partially or fully unlocked. Such a condition can be dangerous if the system 100 is pressured up (i.e. brought up to operating pressure) without the locking mechanisms 160 properly positioned in the locked configuration. Green, which is commonly associated with safety, can be used to show that when the releasing pins 168 extend outwards from the releasing pin holes 268 and the locking pin 166 is retracted into the locking pin hole 266, the locking mechanism 160 is in the locked configuration, and the system 100 can be ready for pressurization.

In some aspects, different colors can be selected for these conditions or to denote other conditions. In some aspects, the pins 166,168 can each define more than one color, such as different colors along their lengths. In some aspects, the indicia can define words and/or symbols, which can be utilized with or without colors. For example, the locking pin 166 can recite "unlocked," so that when it is visible, a user is informed of the status of the locking mechanism 160. Similarly, the releasing pins 168 can recite "locked," along a portion that is exposed when the locking mechanism 160 is in the locked configuration. In some aspects, the indicia can include hash-marks, rings, or other indicia that can be positioned to align at the mouths of the pin holes 266,268 when the pins 166,168 are fully extended in the corresponding configurations of the locking mechanism 160.

In some aspects, the pins 166,168 can be coupled to or controlled by a machine or apparatus. In some aspects, some pins 166,168 can be coordinated. For example and without limitation, the releasing pins 168 of a given locking bar assembly 162 can be linked together, such as by a structural member engaging each releasing pin 168 or extending there between. In some aspects, all of the releasing pins 168 of the entire locking mechanism 160 can be linked, such as by connecting all of the releasing pins 168 together by a frame (not shown) for example and without limitation. For example and without limitation, the frame can engage and coordinate the releasing pins 168 of each locking bar assembly 162. In the aspect shown, a rectangular or X-shaped frame could engage all four releasing pins 168. In some aspects, the locking pins 166 of each locking bar assembly 162 of the locking mechanism 160 can be linked and coordinated. In some aspects, a machine (not shown) can insert the plug 110 into the fitting 130, and the machine can be adapted to manipulate the pins 166,168.

Referring to FIG. 9, each of the locking bars 164 can define a radially inner surface 963 and a radially outer surface 965, with respect to the fitting axis 103, as demonstrated by the left locking bar 164 with respect to the present viewing angle. In the present aspect, the radially inner surface 963 can be curved complimentary to the inner plug recess surface 119. In some aspects, the inner plug recess surface 119 and the radially inner surface 963 can each have the same radius of curvature. In some aspects, the inner plug recess surface 119 and the radially inner surface 963 can have different radii of curvature, respectively. In some aspects, the radially inner surface 963 can be in facing engagement with the inner plug recess surface 119 when the locking bars 164 are in the locked configuration.

In the present aspect, the radially outer surface 965 can be curved to share the same center of curvature, from which the radius of curvature is measured, as the radially inner surface 963. In such aspects, arcs defined by the radially inner surface 963 and the radially outer surface 965 can be concentric. In some aspects, the radially outer surface 965 can have a different center of curvature, and the arc defined by the radially outer surface 965 may not be concentric with the arc defined by the radially inner surface 963. For example and without limitation, in some aspects, the radially outer surface 965 can be curved complimentary to a fitting groove surface 944, which can be defined by a radially outermost surface of the fitting recess 144, with respect to the fitting axis 103. In some aspects, the radially outer surface 965 can be positioned in facing engagement with the fitting groove surface 944 when the locking bars 164 are in the unlocked configuration (shown in FIG. 3). In the present aspect, the radially outer surface 965 can define a different radius of curvature from the fitting groove surface 944. With different radii of curvature, the fitting groove surface 944 and the radially outer surface 965 can tangentially engage one another in the unlocked configuration.

When the locking mechanism 160 is in the locked configuration, each of the locking bar assemblies 162 can be in the locked configuration. When each of the locking bar assemblies 162 are in the locked configuration, each of the locking bars 164 can be in the locked configuration, or locked position, as shown. In the locked configuration, or locked position, each of the locking bars 164 can simultaneously engage, or bridge across, both the plug recess 118 and the fitting recess 144. Specifically, at least a portion of the radially outer surface 965 can be positioned within the fitting recess 144, radially outward from the bore 132 with respect to the fitting axis 103, and at least a portion of the radially inner surface 963 can be positioned within the plug recess 118, radially inward from the bore 132. With the locking bars 164 bridging into each recess 118,144, the plug 110 and the fitting 130 can be substantially axially fixed relative to one another relative to the axes 101,103. In terms of being substantially axially fixed, the plug 110 may be capable of slight axial play relative to the fitting 130 provided by the stacked tolerances between components and deformation under stress; however, the plug 110 cannot axially move relative to the fitting 130 over an axial distance greater than that provided by the tolerances and deformation.

When the locking mechanism 160 is positioned in the locked configuration, the releasing pins 168, as shown by the right locking bar assembly 162 with respect to the present viewing angle, can be depressed until they are flush with the flange face 141 (shown in FIG. 1) to drive each locking bar 164 radially outwards to the unlocked configuration, as described above. If the releasing pins 168 are not driven inwards in unison, such as if tapping each releasing pin 168 in alternating turn, the locking bar 164 may rotate slightly back and forth as it slides outwards to the unlocked configuration; however, the overall effect of the transition can between the locked configuration and the unlocked configuration can be a translation, wherein the rotational orientation of the locking bar 164 can be the same in each configuration. Once the locking mechanism 160 is in the unlocked configuration, the plug 110 can axially move relative to the fitting 130, including removing the plug 110 from the bore 132. With the plug 110 secured in the bore 132, a blind flange (not shown) can be fastened to the flange 140, thereby providing a redundant seal for the fitting 130.

Figure 10:
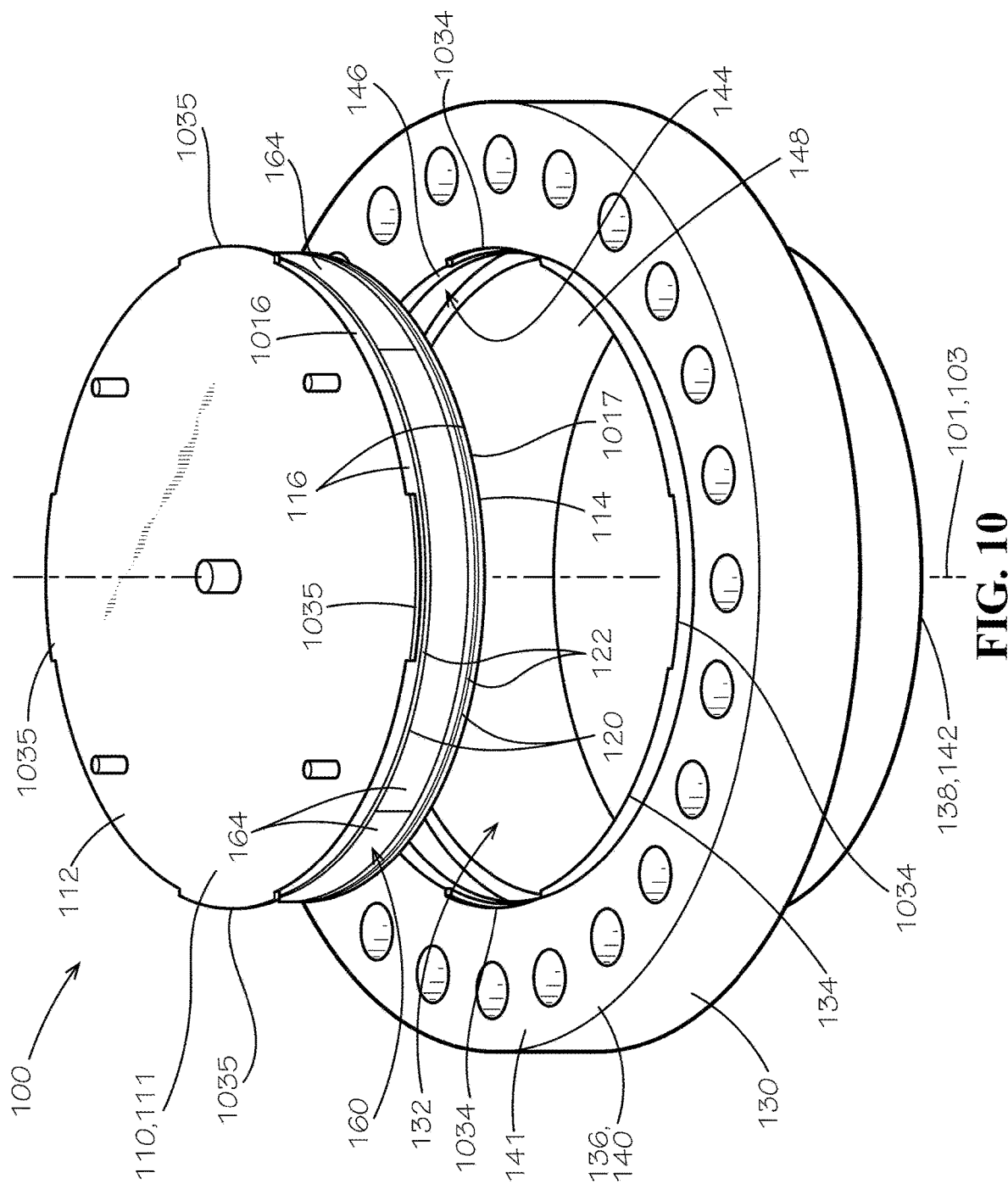
FIG. 10 is a front perspective view of another aspect of the system in accordance with another aspect of the present disclosure showing the locking mechanism in the unlocked configuration with the plug positioned above the fitting.

FIG. 10 shows a perspective view of another aspect of the system 100 wherein the locking mechanism 160 can be integrated into the body 111 of the plug 110 in accordance with another aspect of the present disclosure.

The plug 110 can comprise the body 111 and one or more sealing members 122. The body 111 can define the top body end 112 and the bottom body end 114. The bottom body end 114 can be positioned opposite from the top body end 112. The body 111 can define the outer surface 116 between the top body end 112 and the bottom body end 114. At least portions of the outer surface 116 can be cylindrical and centered about the plug axis 101 of the plug 110. The locking bars 164 of the locking mechanism 160 can be positioned between the top body end 112 and the bottom body end 114. In some aspects, the locking bars 164 can interrupt the outer surface 116. An upper portion 1016 of the outer surface 116 can be defined between the top body end 112 and the locking bars 164. A lower portion 1017 of the outer surface 116 can be defined between the locking bars 164 and the bottom body end 114. With the locking mechanism 160 in the unlocked configuration, as shown in FIG. 10, the locking bars 164 can be positioned flushed with or radially inward from the outer surface 116, with respect to the plug axis 101.

In some aspects, the outer surface 116 and the locking bars 164 can together be substantially cylindrical when the locking mechanism 160 is in the unlocked configuration, such as to say the outer surface 116 and locking bars 164 can be cylindrical with the exception of small gaps and/or transition surfaces between the locking bars 164 and the adjacent portions 1016,1017 of the outer surface 116, the pair of sealing grooves 120, and/or transition surfaces at the body ends 112, 114, such as chamfers, fillets, or other transition profiles, for example and without limitation, and one or more indexing tabs 1035 of the plug 110.

Each sealing groove 120 can extend into one of the portions 1016,1017 of the outer surface 116 with respect to the plug axis 101. The sealing grooves 120 can extend circumferentially around the body 111. The sealing grooves 120 can receive the sealing members 122. In the present aspect, the sealing members 122 can be an O-ring. In some aspects, the sealing members 122 can be a washer, such as a rubber washer for example and without limitation, or any other suitable type of seal. In some aspects, the sealing members 122 can be different types of seals from one another.

The fitting 130 can define the first fitting end 136 and the second fitting end 138. The first fitting end 136 can be positioned opposite from the second fitting end 138. The flange 140 of the fitting 130 can define the first fitting end 136, and the neck 142 of the fitting 130 can define the second fitting end 138.

The flange 140 can define the flange face 141 at the first fitting end 136. The bore 132 can extend from the first fitting end 136 to the second fitting end 138. The intersection of the bore 132 with the flange face 141 can define the opening 134 of the bore 132. The bore 132 can define the fitting axis 103. The opening 134 can define one or more indexing notches 1034, which can cooperate with one or more indexing tabs 1035 of the plug 110 to rotationally fix the plug 110 to the fitting 130 when the plug 110 is inserted into the opening 134. In the aspect shown, the plug 110 can be aligned with the opening 134 of the bore 132, and the axes 101,103 can be coincident.

The fitting recess 144 can extend radially outward from the bore 132 and into the fitting 130 with respect to the fitting axis 103. The flange 140 can define the upper portion 146 of the bore 132 between the first fitting end 136 and the fitting recess 144. The neck 142 and/or the flange 140 can define the lower portion 148 of the bore 132 between the fitting recess 144 and the second fitting end 138. In the present aspect, the fitting recess 144 can extend circumferentially around the bore 132. In the present aspect, the fitting recess 144 can extend entirely around the circumference of the bore 132 in the form of a groove. In some aspects, the fitting recess 144 can comprise multiple separate depressions, which can be spaced circumferentially around the bore 132. As described below in greater detail, the fitting recess 144 can receive the locking bars 164 when the plug 110 is inserted into the bore 132 and the locking mechanism 160 is positioned in the locked configuration, thereby securing the plug 110 within the opening 134 of the bore 132.

Figure 11:
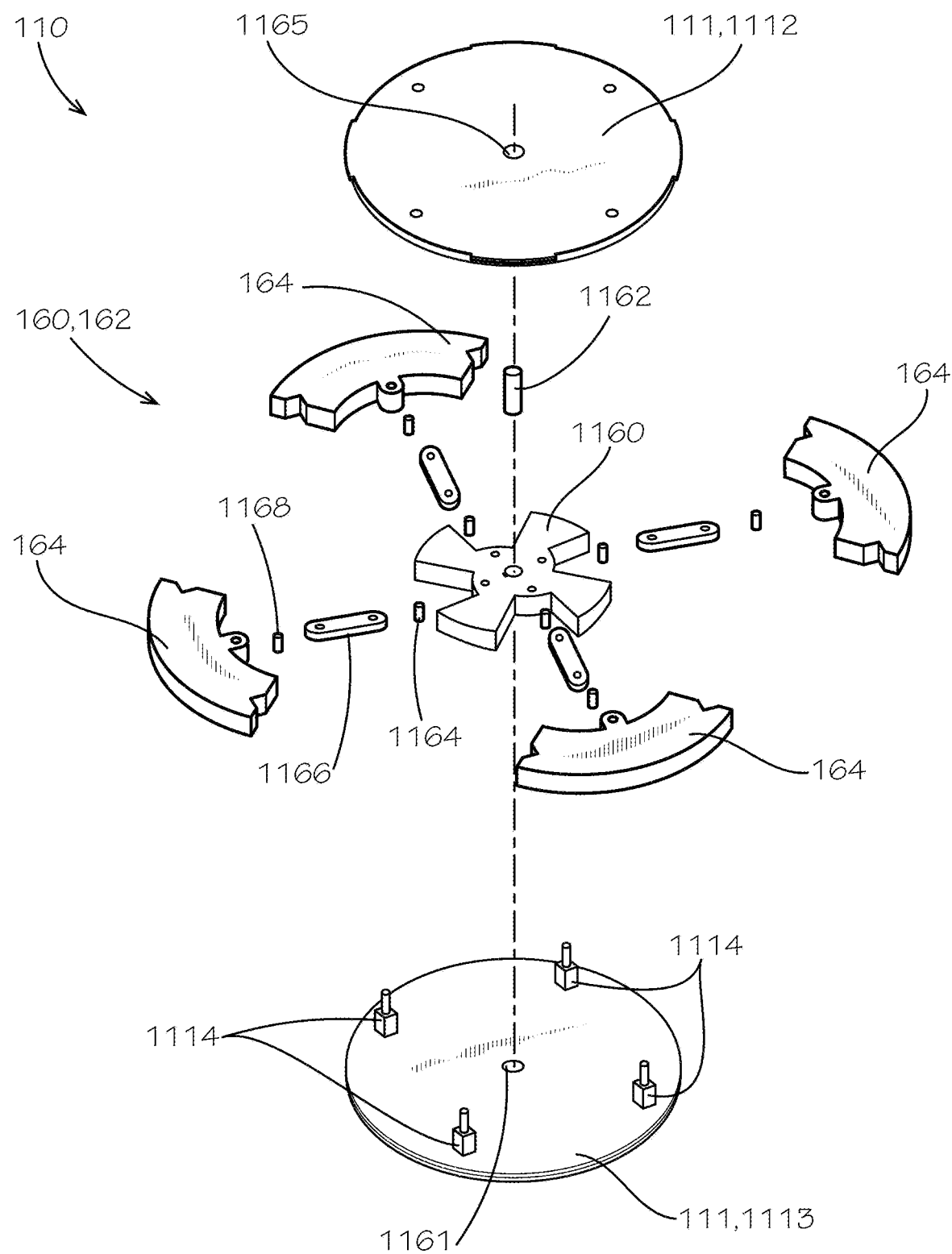
FIG. 11 is an exploded perspective view of the plug and the locking mechanism of FIG. 10 showing a top plate and a bottom plate of the plug.

FIG. 11 is an exploded view of the plug 110 of FIG. 10.

The body 111 can comprise a top plate 1112, a bottom plate 1113, and a plurality of standoffs 1114. The standoffs 1114 can extend between the top plate 1112 and the bottom plate 1113 to space the plates 1112,1113 apart from one another, and some or all of the locking mechanism 160 can be positioned between the plates 1112, 1113.

In the present aspect, the locking mechanism 160 can comprise a single locking bar assembly 162 configured to simultaneously actuate each of the locking bars 164. The locking bar assembly 162 can comprise a driving member 1160, which can be secured between the plates 1112, 1113 by a center pin 1162. In the aspect shown, the driving member 1160 can be a rotor. In the present aspect, the bottom plate 1113 can define a depression 1161 configured to receive the center pin 1162, and the top plate 1112 can define an opening 1165 configured to receive the center pin 1162. In the present aspect, the driving member 1160 can ride on the center pin 1162, and the center pin 1162 can maintain a position of the driving member 1160 between the plates 1112,1113. In the present aspect, the driving member 1160 can be rotationally fixed to the center pin 1162, and rotating the center pin 1162 relative to the plates 1112,1113 can rotate the driving member 1160 relative to the plates 1112, 1113. In some aspects, the driving member 1160 can incorporate a gear mechanism (not shown), such as a planetary gear mechanism for example and without limitation, and the driving member 1160 may not be rotationally fixed to the center pin 1162.

As shown by the left locking bar 164, with respect to the present viewing angle, each locking bar 164 can be coupled to the driving member 1160 by an inner pin 1164, one or more links 1166, and an outer pin 1168. The inner pin 1164 can secure the link 1166 to the driving member 1160. The outer pin 1168 can secure the link 1166 to the locking bar 164.

FIGS. 12-16 show the system 100 with the top plate 1112 (shown in FIG. 11) of the plug 110 removed.

Figure 12:
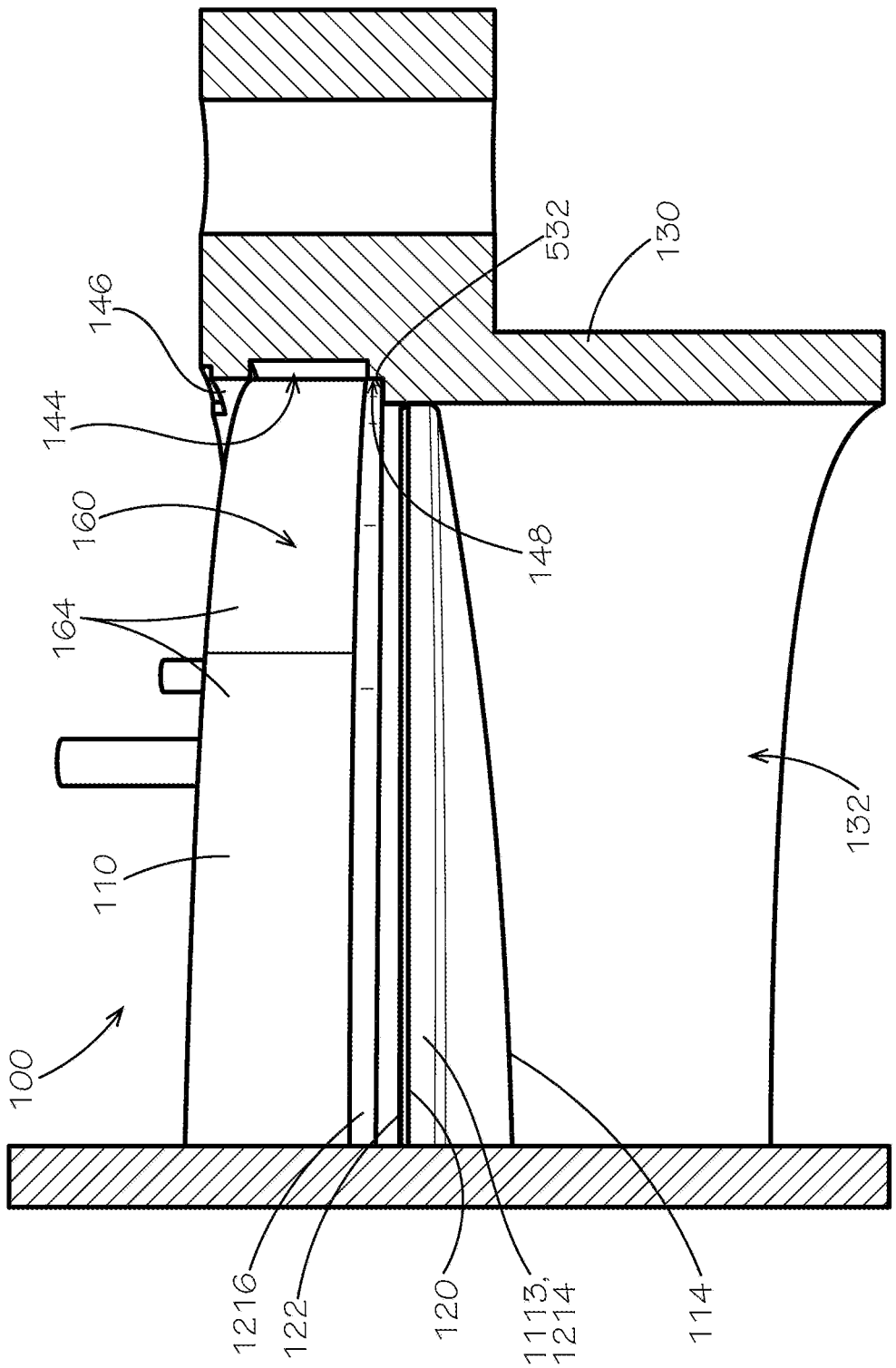
FIG. 12 is a partial cross-sectional view of the system of FIG. 10 with the plug inserted in the bore of the fitting, the locking mechanism positioned in the unlocked configuration, and the top plate of the plug removed.

FIG. 12 shows a partial cross-sectional view of another aspect of the fitting 130 and the plug 110, with the plug 110 shown positioned in the bore 132, and the locking mechanism 160 positioned in the unlocked configuration. The fitting 130 can define the shoulder 532, which can extend radially inward from surrounding portions of the bore 132, with respect to the fitting axis 103 (shown in FIG. 13). With the plug 110 positioned in the bore 132, the bottom body end 114 can rest upon the shoulder 532.

The sealing member 122 can seal with the bore 132. In some aspects, the sealing member 122 can specifically seal with the lower portion 148 of the bore 132. In some aspects, the sealing member 122 or another sealing member can be positioned between the bottom body end 114 and the shoulder 532 to form a seal there between. The bottom plate 1113 can define a reduced portion 1214 at the bottom body end 114 and a ledge 1216 between the locking bars 164. In the aspect shown, the sealing groove 120 and the sealing member 122 can be on the reduced portion 1214, and the sealing member 122 can seal with the bore 132 below the shoulder 532. In some aspects, the bottom body end 114 can rest on the shoulder 532. In such aspects, the bottom plate 1113 may not define the reduced portion 1214 or the ledge 1216. In some aspects, the bottom body end 114 can define a domed shape. In some aspects, the bottom body end 114 can be flat, conical, frustoconical, hemispherical, or any other suitable shape.

As shown, when the locking mechanism 160 is in the unlocked configuration, the locking bars 164 can be positioned radially inward from the fitting recess 144, such that the locking bars 164 do not engage the fitting recess 144. In the aspect shown, the locking bars 164 can be positioned radially inward from the upper portion 146 and the lower portion 148 of the bore 132. In the unlocked position, the locking bars 164 may or may not be positioned radially inward from the shoulder 532.

Figure 13:
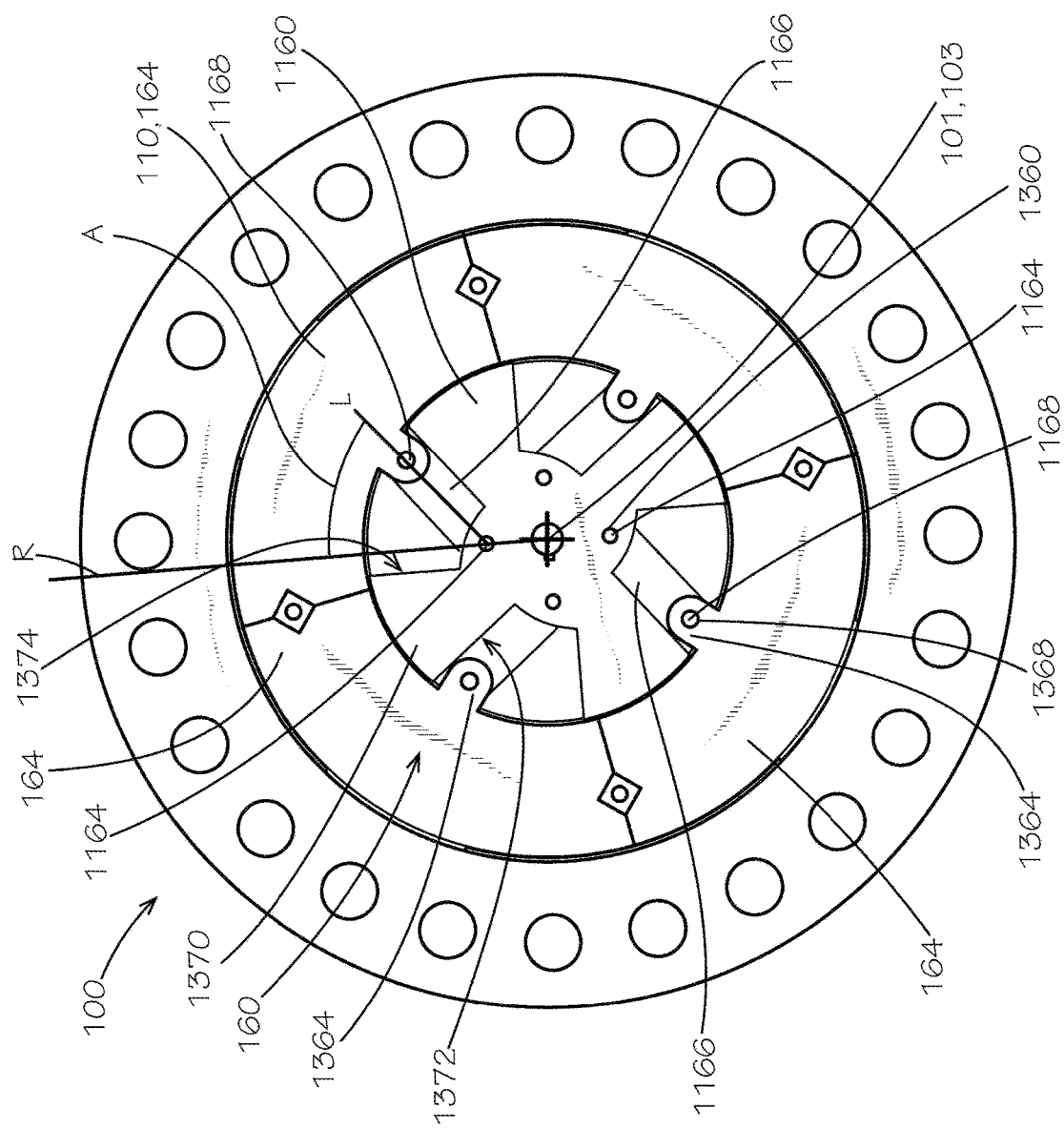
FIG. 13 is a top view of the system of FIG. 10 with the top plate of the plug removed and the locking mechanism shown in the unlocked configuration.
Figure 14:
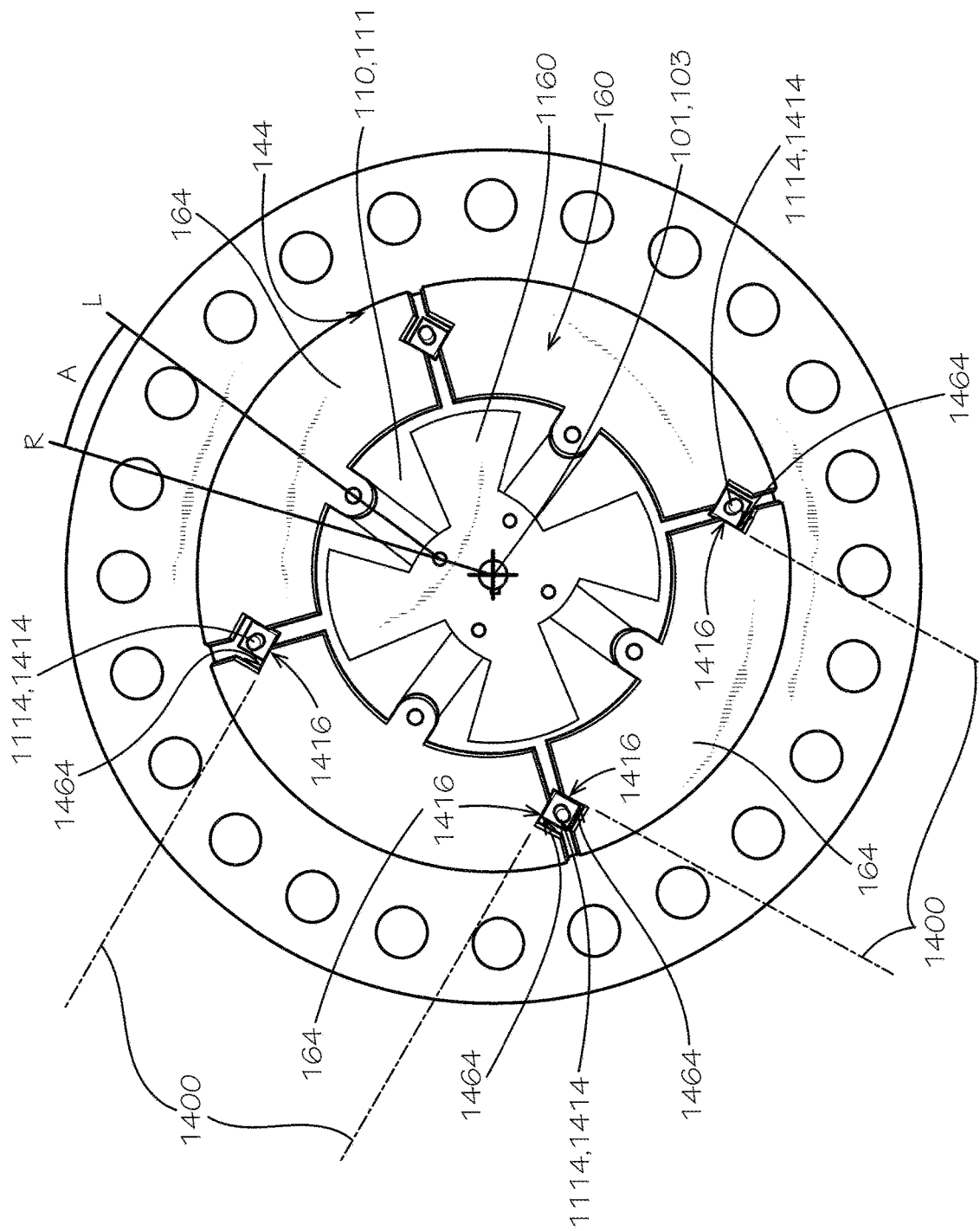
FIG. 14 is a top view of the system of FIG. 10 with the top plate of the plug removed and the locking mechanism shown partially reconfigured from the unlocked configuration to the locked configuration.
Figure 15:
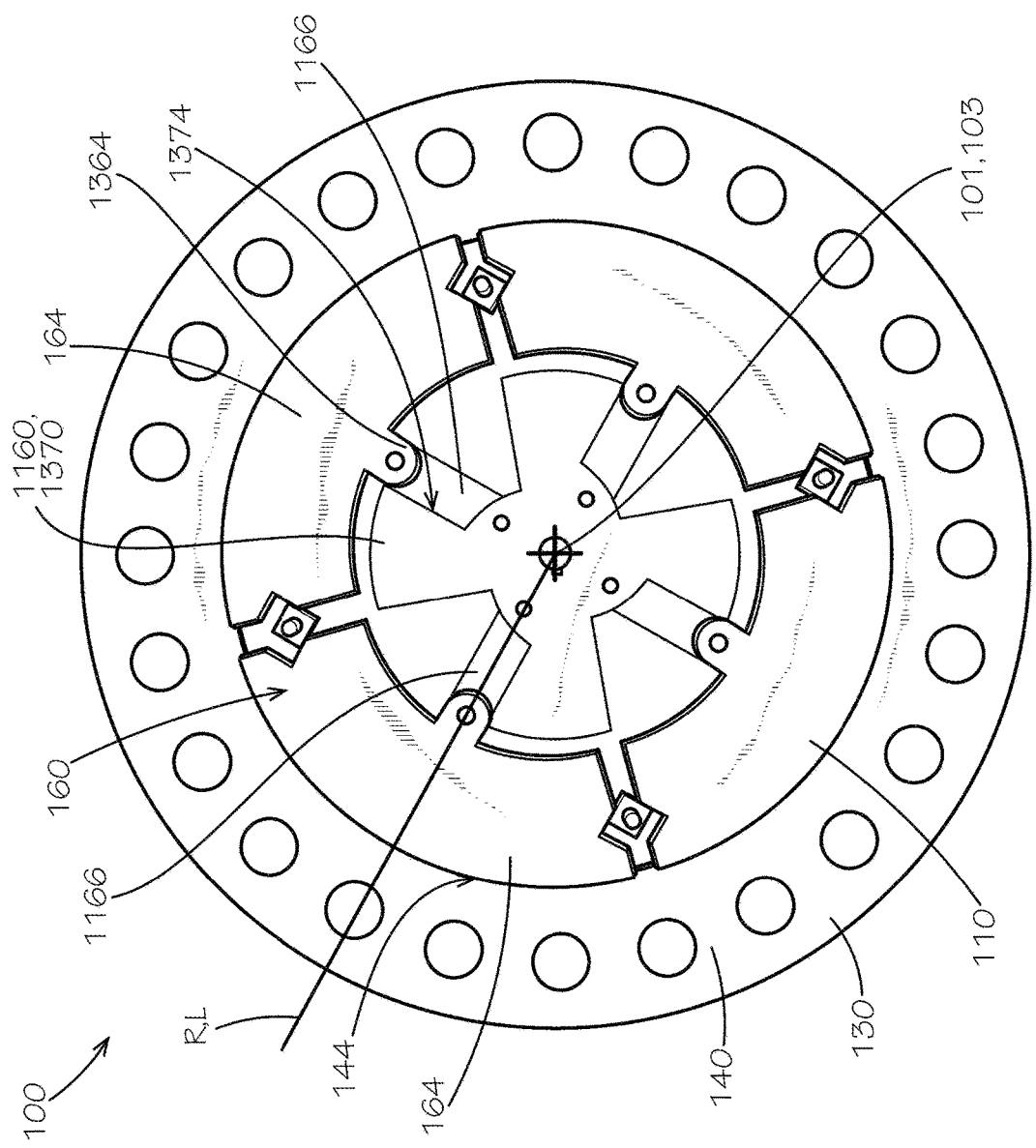
FIG. 15 is a top view of the system of FIG. 10 with the top plate of the plug removed and the locking mechanism shown in the locked configuration.

FIG. 13-15 demonstrate one functionality of the present aspect of the locking mechanism 160. FIG. 13 is a top view of the plug 110 with the top plate 1112 removed, and the locking mechanism 160 shown in the unlocked configuration. FIG. 14 is a top view of the plug 110 with the top plate 1112 removed, and the locking mechanism 160 shown in transition between the unlocked configuration and the locked configuration. FIG. 15 is a top view of the plug 110 with the top plate 1112 removed, and the locking mechanism 160 shown in the locked configuration.

Referring to FIG. 13, as demonstrated by the lower-left locking bar 164, with respect to the present viewing angle, the locking bar 164 can define an outer pin hole 1368, which can receive the outer pin 1168 to couple the link 1166 to the locking bar 164. In the present aspect, the locking bar 164 can comprise a pair of tabs 1364, and the outer pin 1168 can secure the link 1166 between the tabs 1364. The driving member 1160 can define an inner pin hole 1360, and the inner pin 1164 can couple the link 1166 to the driving member 1160. For example and without limitation, the driving member 1160 can define a pocket (not shown) that receives the link 1166, and the inner pin 1164 can bridge across the pocket to secure the link 1166 to the driving member 1160.

As demonstrated by the top-right locking bar 164, with respect to the present viewing angle, a radial directional line R can extend from the plug axis 101 radially outwards through a center of the inner pin 1164. The radial directional line R can bisect the inner pin 1164. A link directional line L can bisect both the inner pin 1164 and the outer pin 1168 for the respective link 1166. A link angle A can be defined between the radial directional line R and the link directional line L. In the unlocked configuration, the link angle A can have its maximum value. For example, in the unlocked configuration, the link angle A can be between 15 and 75 degrees. Preferably, the link angle A can be between 25 and 65 degrees in the unlocked configuration. Most preferably, the link angle A can be between 35 and 55 degrees in the unlocked configuration.

As demonstrated by the top-left locking bar 164, the driving member 1160 can define a plurality of wings 1370 extending outwards and away from the plug axis 101. Each wing 1370 can define a first stopper surface 1372 and a second stopper surface 1374. In the locked configuration, the first stopper surface 1372 can contact the tabs 1364 of the locking bar 164 and/or the link 1166 in the unlocked configuration to limit rotation in a first rotational direction. The second stopper surface 1374 can be positioned opposite from the first stopper surface 1372, and the second stopper surface 1374 can contact the tabs 1364 and/or the link 1166 of the other adjacent locking bar 164 to limit rotation in a second rotational direction, as shown in FIG. 15.

In the unlocked configuration, adjacent locking bars 164 can also contact one another, and in the present aspect, the locking bars 164 can form an unbroken circular shape in the unlocked configuration.

As demonstrated by FIGS. 14 and 15, the locking mechanism 160 can be repositioned to the locked configuration by rotating the driving member 1160 relative to the locking bars 164. The locking bars 164 can move radially inward or radially outward when reconfiguring between the locked configuration and the unlocked configuration. Specifically, the locking bars 164 can linearly move radially inward or radially outward when reconfiguring between the locked configuration and the unlocked configuration. More specifically, the locking bars 164 can linearly move radially inward or radially outward in a radial direction that extends through the plug axis 101 when reconfiguring between the locked configuration and the unlocked configuration.

Turning to FIG. 14, each of the standoffs 1114 can define a guide portion 1414. Each guide portion 1414 can define a pair of guide bearing surfaces 1416. Each of the guide portions 1414 can engage with two adjacent locking bars 164 so that each guide bearing surface 1416 of a given guide portion 1414 engages with a different locking bar 164. Engagement of the standoffs 1114 with the respective locking bars 164 can rotationally fix the locking bars 164 relative to the body 111. Specifically, the guide bearing surfaces 1416 can engage with locking bar bearing surfaces 1464 defined by the locking bars 164. The guide bearing surfaces 1416 on either side of a given locking bar 164 can define parallel travel paths 1400, as demonstrated by the two left locking bars 164 with respect to the present viewing angle, which can confine the locking bars 164 to translating (i.e. sliding without rotation) in the radial direction with respect to the plug axis 101. In some aspects, the locking bars 164 can otherwise be rotationally fixed relative to the body 111 of the plug 110.

In the present aspects, the locking mechanism 160 can comprise four locking bars 164, each extending along a 90-degree arc. The locking bars 164 can each define a substantially flat arcuate plate in the present aspect. In some aspects, the locking mechanism 160 can comprise greater or fewer than four locking bars 164, and the body 111 can comprise greater or fewer than four standoffs 1114. In the present aspect, the two guide bearing surfaces 1416 can positioned at 90-degrees to one another, the same as the arc of each locking bar 164. In an aspect with five locking bars 164, the locking bars 164 can each extend along a 72-degree arc, and the guide bearing surfaces 1416 of each standoff 1114 can be angled at 72-degrees relative to one another.

In the present aspect, each of the guide portions 1414 can define a square cross-section. In other aspects, the guide portion 1414 can define a different cross-sectional shape, such as a triangle, a pentagon, or any other suitable shape.

In some aspects, rather than being positioned between adjacent standoffs 1114, each locking bar 164 can define a slot extending in a radial direction (not shown) that can receive one of the standoffs 1114. In such aspects, parallel sides of the slot can engage with parallel sides of the standoff 1114 to confine the locking bars 164 to translation in the radial direction with respect to the plug axis 101. Specifically, each locking bars 164 can linearly translate (i.e. slide in a straight path without rotating) in the radial direction with respect to the plug axis 101.

As the driving member 1160 rotates relative to the body 111, the link angle A between the radial directional line R and the link directional line L can reduce, and the locking bars 164 can be driven radially outward into the fitting recess 144.

Figure 16:
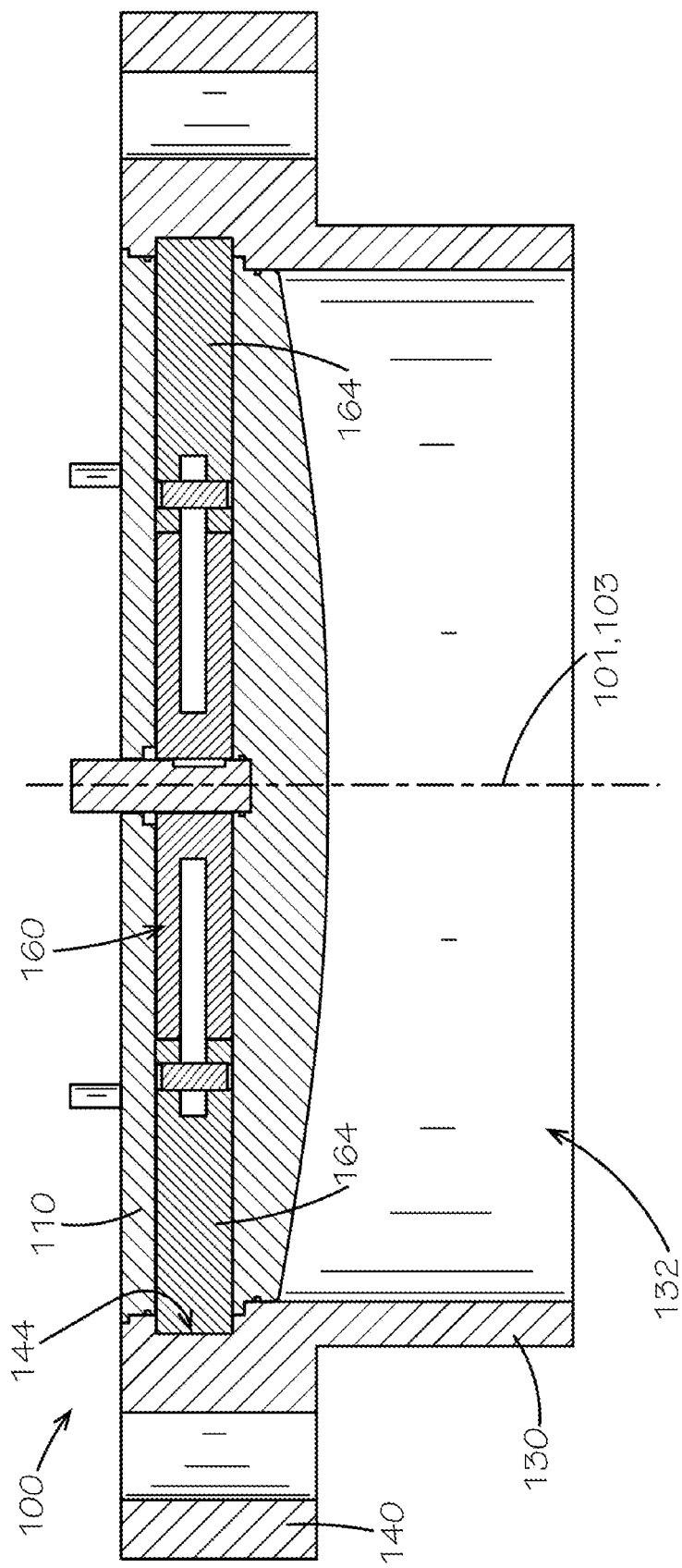
FIG. 16 is a cross-sectional view of the system of FIG. 10 with the locking mechanism shown in the locked configuration.

Turning to FIGS. 15 and 16, the locking mechanism 160 is shown in the locked configuration. In the locked configuration, the locking bars 164 can fully engage the fitting recess 144, thereby limiting axial movement of the plug 110 relative to the fitting 130 along the fitting axis 103. With the plug 110 secured in the bore 132 (shown in FIG. 16), a blind flange (not shown) can be bolted to the flange 140 of the fitting 130.

As shown in FIG. 15, in the present aspect, the links 1166 can be aligned in a radial direction relative to the plug axis 101 and as shown by radial directional line R and the link directional line L, which can be coincident. The link angle A between them can be 0 degrees. In other aspects, the link angle A can be between 10 and −10 degrees. In some aspects, it can be desirable for the driving member 1160 to rotate the links 1166 "over center" so that the link angle A defines a negative value. In such aspects, the locking mechanism 160 can resist radially inward pressure on the locking bars 164 without rotating back towards the unlocked configuration. Instead, radially inward pressure on the locking bars 164 would bias the driving member 1160 to rotate in a direction away from the unlocked configuration.

Figure 17:
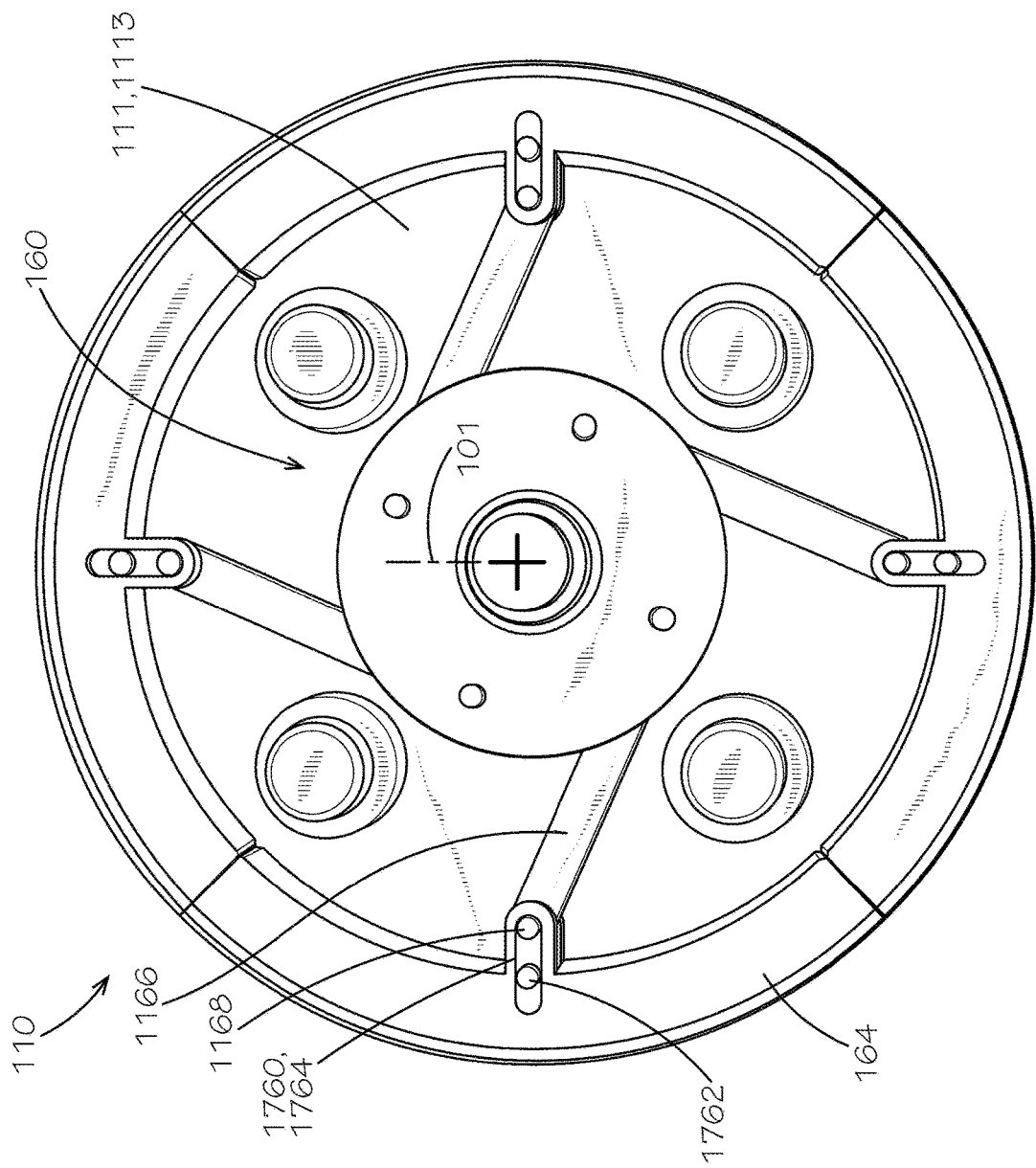
FIG. 17 is a top view of another aspect of the plug, shown in partial transparency, and another aspect of the locking mechanism, shown in the unlocked configuration, in accordance with another aspect of the present disclosure.
Figure 18:
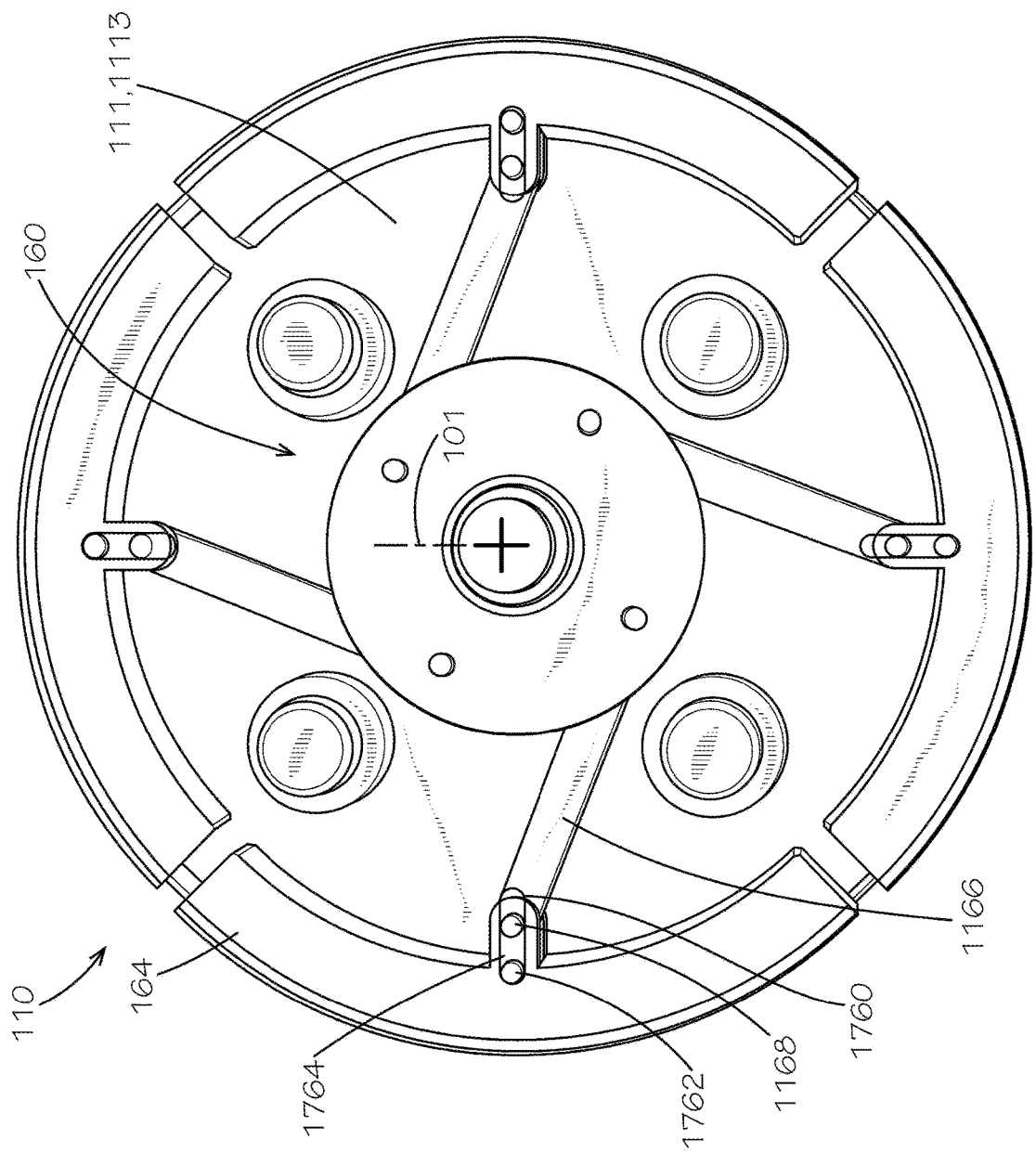
FIG. 18 is a top view of the plug of FIG. 17, shown in partial transparency, and the locking mechanism of FIG. 17, shown in the locked configuration.

FIGS. 17 and 18 show another aspect of the plug 110 in accordance with another aspect of the present disclosure, wherein the locking mechanism 160 can be integrated into the body 111 of the plug 110. The locking mechanism 160 is shown in the unlocked configuration in FIG. 17. The locking mechanism 160 is shown in the locked configuration in FIG. 18.

As demonstrated by the left locking bar 164 with respect to the present viewing angle, the locking bars 164 can define bar guide slots 1764 extending in a radial direction with respect to the plug axis 101. The body 111 can comprise guide pins 1762, which can extend between the top plate (not shown), which can be similar to the top plate 1112 of FIG. 11, and the bottom plate 1113. The guide pins 1762 can be fixed between the top and bottom plates, and the guide pins 1762 can extend through the bar guide slots 1764.

The top plate and the bottom plate 1113 can also define plate guide slots 1760 (shown in transparency underlying the bar guide slot 1764 in FIG. 17 and shown in transparency partially exposed in FIG. 18). The outer pins 1168 can be sized to engage the plate guide slots 1760 so that the outer pins 1168 can be confined to travel in a radial direction with respect to the plug axis 101. The outer pins 1168 can be fixed to the respective locking bars 164 and links 1166.

Engagement between the guide pins 1762 and the bar guide slots 1764 and between the outer pin 1168 and the plate guide slots 1760 can cooperate to prevent rotation of the locking bars 164 and limit the locking bars 164 to translating radially inward and outward between the locked and unlocked configurations. Engagement between the guide pins 1762 and the locking bars 164 can rotationally fix the locking bars 164 relative to the body 111. In the present aspect, the guide pins 1762 and/or the outer pins 1168 can be shaped to define one or more flat surfaces that engage the sides of the respective guide slots 1760,1764. In such aspects, either the guide pins 1762 or the outer pins 1168 can be configured to prevent rotation of the locking bars 164 by themselves. For example and without limitation, the guide pin 1762 can define a rectangular profile that can be elongated in the radial direction with respect to the plug axis 101. The guide pin 1762 can be closely fit to the bar guide slot 1764 to prevent rotation of the locking bar 164 and confine the locking bar 164 to translation in the radial direction with respect to the plug axis 101. In such aspects, the outer pins 1168 may not engage the plate guide slots 1760, and the top and bottom plates may not define these plate guide slots 1760.

Figure 19:
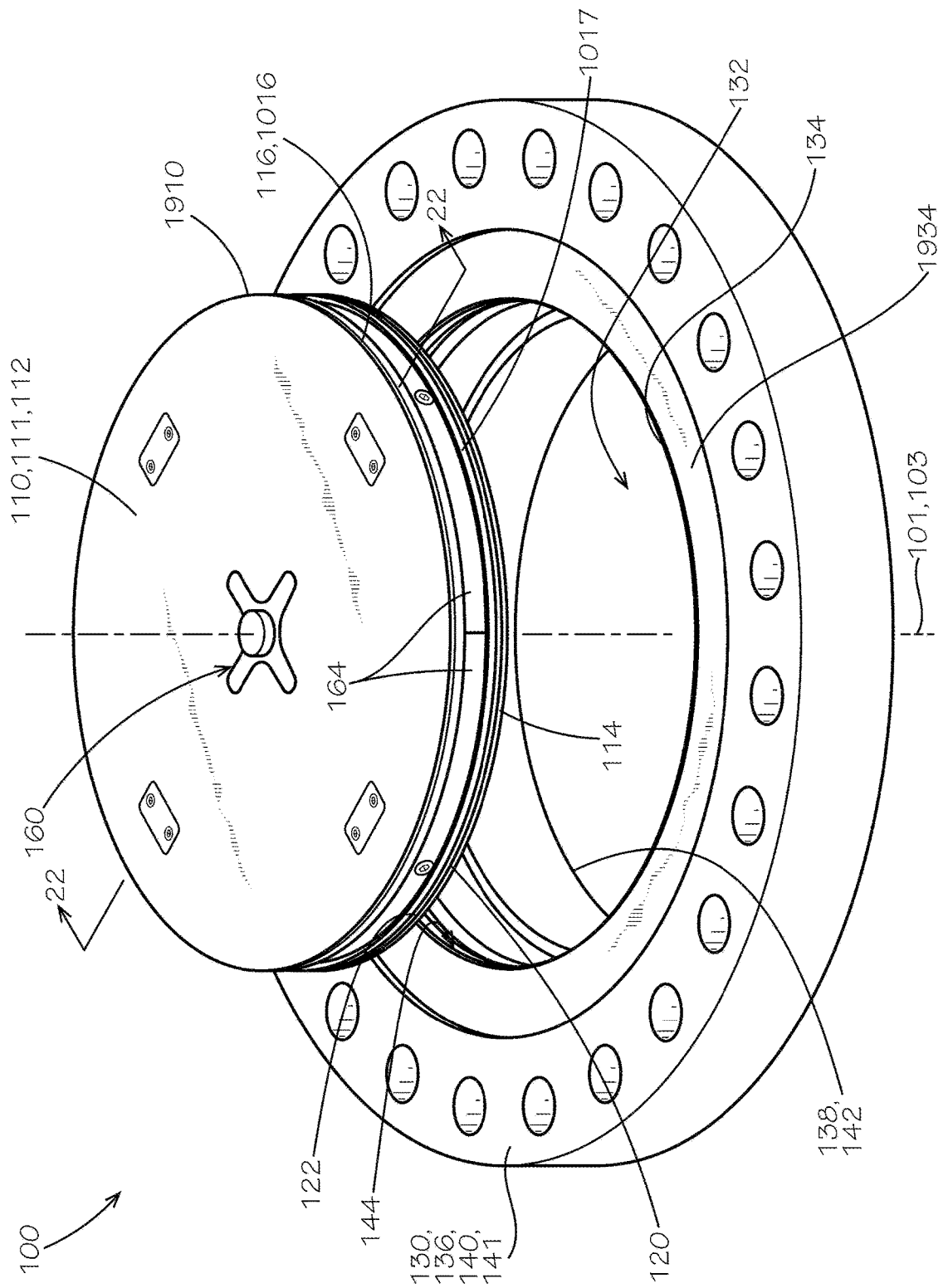
FIG. 19 is a perspective front view of another aspect of the system in accordance with another aspect of the present disclosure showing the plug positioned above the fitting and the locking mechanism in the unlocked configuration.

FIG. 19 is a perspective view of another aspect of the system 100 wherein the locking mechanism 160 can be integrated into the body 111 of the plug 110 in accordance with another aspect of the present disclosure.

The plug 110 can comprise the body 111 and one or more of the sealing members 122. The body 111 can define the top body end 112 and the bottom body end 114. The bottom body end 114 can be positioned opposite from the top body end 112. The body 111 can define the outer surface 116 between the top body end 112 and the bottom body end 114. At least portions of the outer surface 116 can be cylindrical and centered about the plug axis 101 of the plug 110. The locking bars 164 of the locking mechanism 160 can be positioned between the top body end 112 and the bottom body end 114. In some aspects, the locking bars 164 can interrupt the outer surface 116. The upper portion 1016 of the outer surface 116 can be defined between the top body end 112 and the locking bars 164. The lower portion 1017 of the outer surface 116 can be defined between the locking bars 164 and the bottom body end 114. With the locking mechanism 160 in the unlocked configuration, as shown in FIG. 19, the locking bars 164 can be positioned flushed with or radially inward from the outer surface 116, with respect to the plug axis 101.

In some aspects, the outer surface 116 and the locking bars 164 can together be substantially cylindrical when the locking mechanism 160 is in the unlocked configuration, such as to say the outer surface 116 and locking bars 164 can be cylindrical with the exception of small gaps between the locking bars 164 and the adjacent portions 1016, 1017 of the outer surface 116, the sealing groove 120, and/or transition surfaces at the bottom body end 114 and/or edges of the locking bars 164, such as chamfers, fillets, or other transition profiles, for example and without limitation, and a lip 1910 at the top body end 112. The lip 1910 can extend radially outward from adjacent portions of the outer surface 116 with respect to the plug axis 101, and the lip 1910 can rest upon the fitting 130 when the plug 110 is inserted into the fitting 130.

The sealing groove 120 can extend into the lower portion 1017 of the outer surface 116 with respect to the plug axis 101. In some aspects, the sealing groove 120 or an additional sealing groove can extend into the upper portion 1016 of the outer surface 116. The sealing grooves 120 can extend circumferentially around the body 111. The sealing grooves 120 can receive the sealing members 122. In the present aspect, each of the sealing members 122 can be an O-ring. In some aspects, the sealing members 122 can be a washer, such as a rubber washer for example and without limitation, or any other suitable type of seal. In some aspects, the sealing members 122 can be different types of seals from one another.

The fitting 130 can define the first fitting end 136 and the second fitting end 138. The first fitting end 136 can be positioned opposite from the second fitting end 138. The flange 140 of the fitting 130 can define the first fitting end 136, and the neck 142 of the fitting 130 can define the second fitting end 138.

The flange 140 can define the flange face 141 at the first fitting end 136. The bore 132 can extend from the first fitting end 136 to the second fitting end 138. The intersection of the bore 132 with the flange face 141 can define the opening 134 of the bore 132. The bore 132 can define the fitting axis 103. The flange face 141 can define a recessed ring 1934 extending around the opening 134, and the lip 1910 can rest upon the recessed ring 1934 when the plug 110 is inserted into the bore 132. In the aspect shown, the plug 110 can be aligned with the opening 134 of the bore 132, and the axes 101, 103 can be coincident.

The fitting recess 144 can extend radially outward from the bore 132 and into the fitting 130 with respect to the fitting axis 103. The flange 140 can define the upper portion 146 of the bore 132 between the first fitting end 136 and the fitting recess 144. The neck 142 and/or the flange 140 can define the lower portion 148 of the bore 132 between the fitting recess 144 and the second fitting end 138. In the present aspect, the fitting recess 144 can extend circumferentially around the bore 132. In the present aspect, the fitting recess 144 can extend entirely around the circumference of the bore 132 in the form of a groove. In some aspects, the fitting recess 144 can comprise multiple separate depressions, which can be spaced circumferentially around the bore 132. As described below in greater detail, the fitting recess 144 can receive the locking bars 164 when the plug 110 is inserted into the bore 132 and the locking mechanism 160 is positioned in the locked configuration, thereby securing the plug 110 within the opening 134 of the bore 132.

Figure 20:
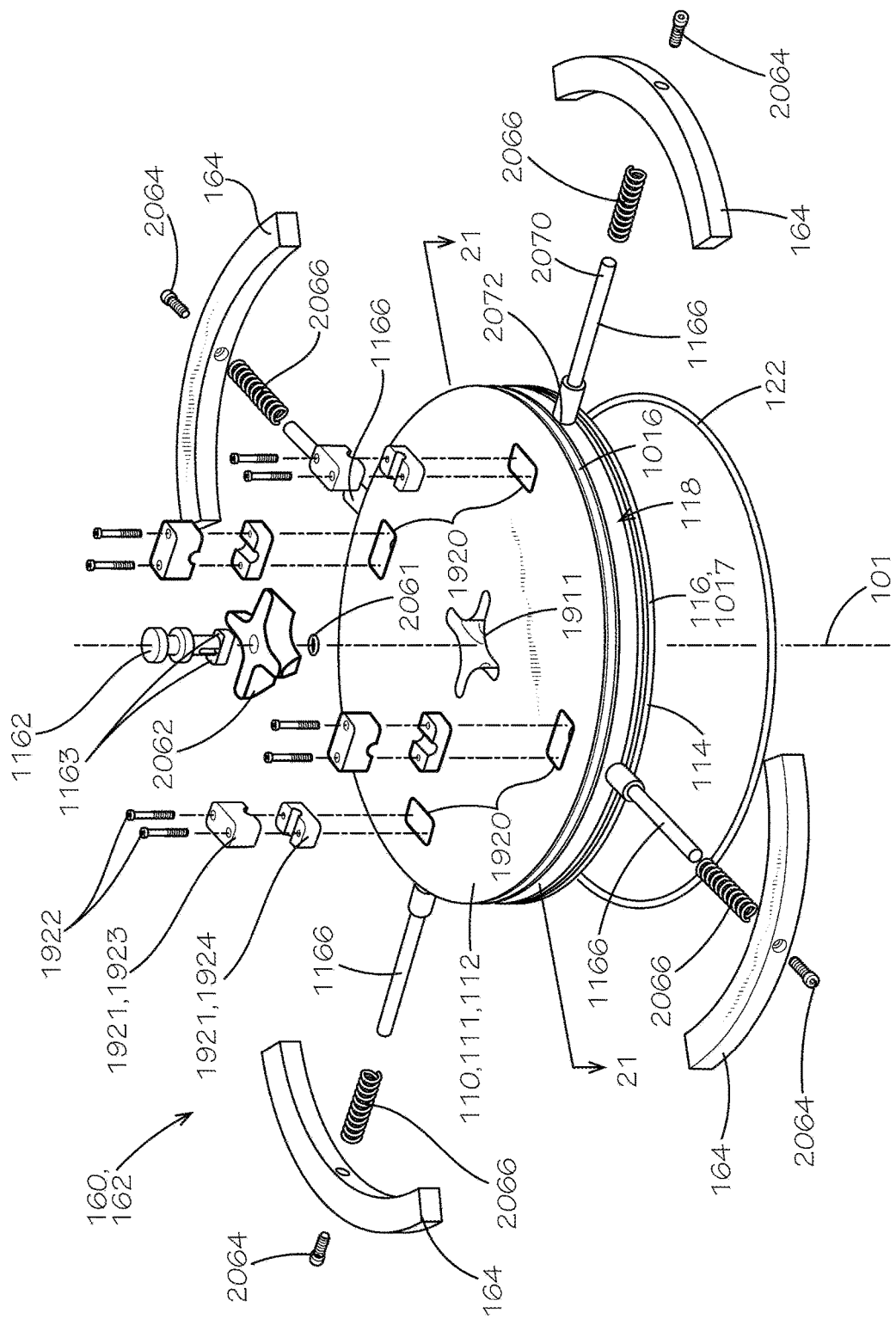
FIG. 20 is an exploded view of the plug and the locking mechanism of FIG. 19.

FIG. 20 is an exploded view of the plug 110 and the locking mechanism 160 of FIG. 19. The body 111 can define a center cavity 1911 and a plurality of mounting block cavities 1920 extending into the top body end 112 towards the bottom body end 114. The body 111 can define the plug recess 118 extending radially inward into the outer surface 116 between the upper portion 1016 and the lower portion 1017.

Figure 21:
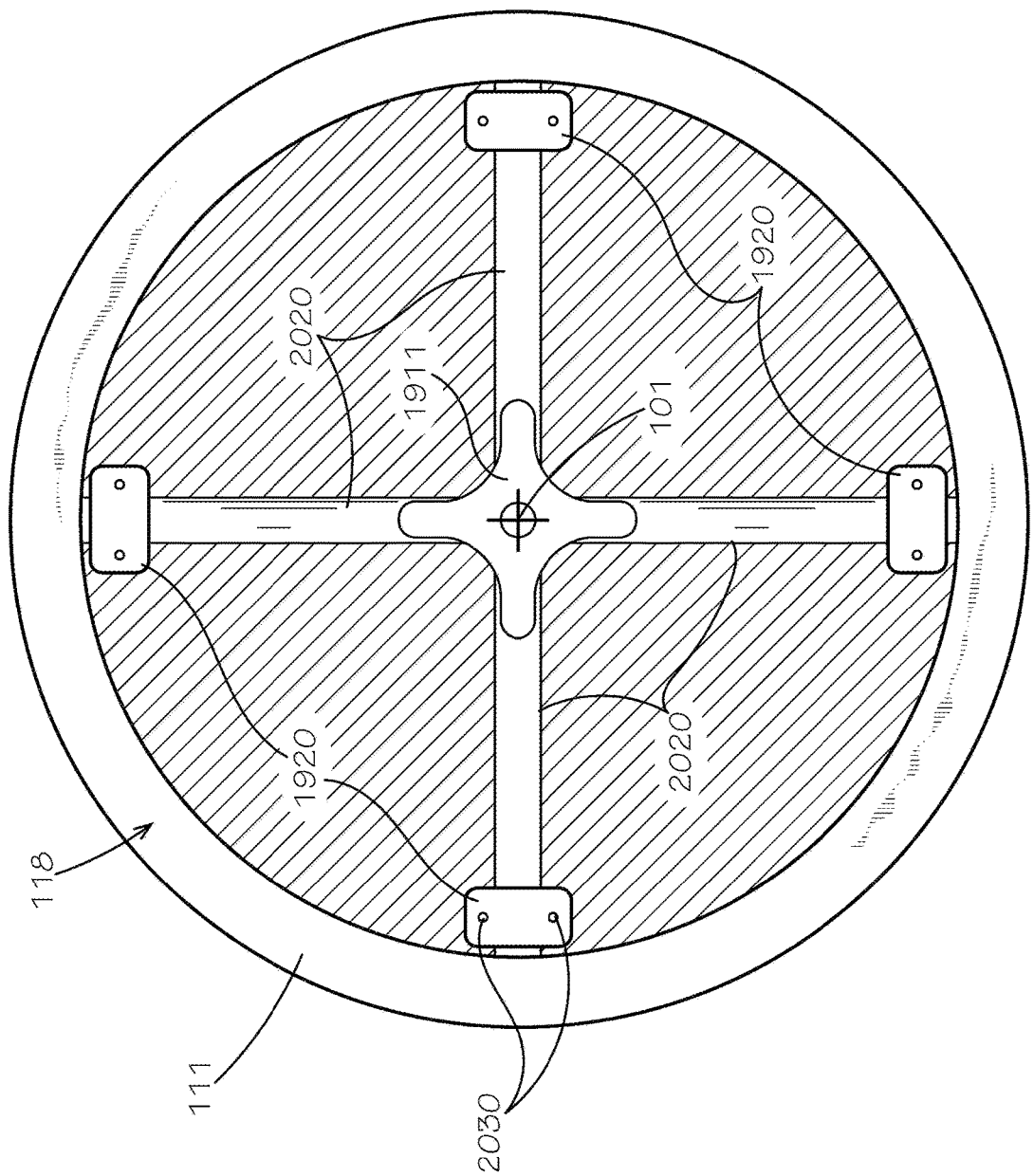
FIG. 21 is a cross-sectional view of a body of the plug taken along line 21-21 shown in FIG. 20.

Referring ahead to FIG. 21, which is a cross-sectional view of the body 111 taken along Line 21-21 shown in FIG. 20, the plug recess 118, the center cavity 1911, and the mounting block cavities 1920 can all be interconnected. The body 111 can define a plurality of channels 2020 extending from the plug recess 118 to the center cavity 1911. In the present aspect, each of the channels 2020 can extend in a radial direction with respect to the plug axis 101. Each one of the channels 2020 can intersect a different one of the mounting block cavities 1920. As demonstrated by the left mounting block cavity 1920, with respect to the present viewing angle, each mounting block cavity 1920 can define one or more fastener holes 2030.

Returning to FIG. 20, the locking mechanism 160 can comprise a single locking bar assembly 162 that can be configured to simultaneously actuate each of the locking bars 164. In the present aspect, the locking bar assembly 162 can comprise at least one locking bar 164, at least one fastener 2064, at least one biasing member 2066, at least one link 1166, the center pin 1162, a driving member 2062, and a center seal 2061. In the present aspect, the driving member 2062 can be a cam, such as a linear cam for example and without limitation, wherein linear motion in one direction can result in linear motion of another component, such as the at least on link 1166 or the at least one locking bar 164, in another direction. In some aspects, the locking bar assembly 162 can comprise greater or fewer components, and/or some components can be combined into a single component. For example and without limitation, in some aspects, the center pin 1162 and the driving member 2062 can be combined into a single component.

As demonstrated by the bottom right link 1166, with respect to the present viewing angle, the links 1166 can define an outer end 2070 and an inner end 2072. The inner end 2072 can be enlarged relative to the outer end 2070. As demonstrated by the upper-left mounting block cavity 1920, with respect to the present viewing angle, the body 111 can comprise at least one mounting block 1921 and at least one fastener 1922 to be positioned in each mounting block cavity 1920. In the present aspect, the at least one mounting block 1921 can comprise an upper mounting block 1923 and a lower mounting block 1924.

When assembled, the at least one mounting block 1921 can be fastened in the respective mounting block cavities 1920 around the respective links 1166, which can be inserted into the channels 2020 (shown in FIG. 20). The fasteners 1922 can engage the fastener holes 2030 (shown in FIG. 21) to secure the mounting blocks 1921 in the respective mounting block cavities 1920. The biasing members 2066 can be captured on the respective links 1166 between the mounting blocks 1921 and the enlarged inner ends 2072 of the links 1166. The biasing members 2066 can bias the links 1166 radially inward with respect to the plug axis 101. For example and without limitation, the biasing members 2066 can be compression coil springs, one or more Belleville springs, a wave spring, or any other suitable type of biasing member. Each locking bar 164 can be fastened to the outer end 2070 of the respective link 1166 by the respective fastener 2064. The locking bars 164 can be rotationally fixed to the respective links 1166 by the respective fasteners 2064. Engagement between the links 1166 and the mounting blocks 1921 can rotationally fix the locking bars 164 relative to the body 111.

The center pin 1162 can be inserted through the driving member 2062, and the center seal 2061 can be seated between the center pin 1162 and the body 111. In the present aspect, the center pin 1162 can comprise multiple components, and the center pin 1162 can be at least partially disassembled when inserting the center pin 1162 through the driving member 2062. In some aspects, the center pin 1162 can be assembled around the driving member 2062 to secure the driving member 2062 in the center cavity 1911. The center pin 1162 can define one or more locking lugs 1163, which can engage with the body 111 to secure the locking mechanism 160 in the locked configuration as discussed below on greater detail.

Figure 22:
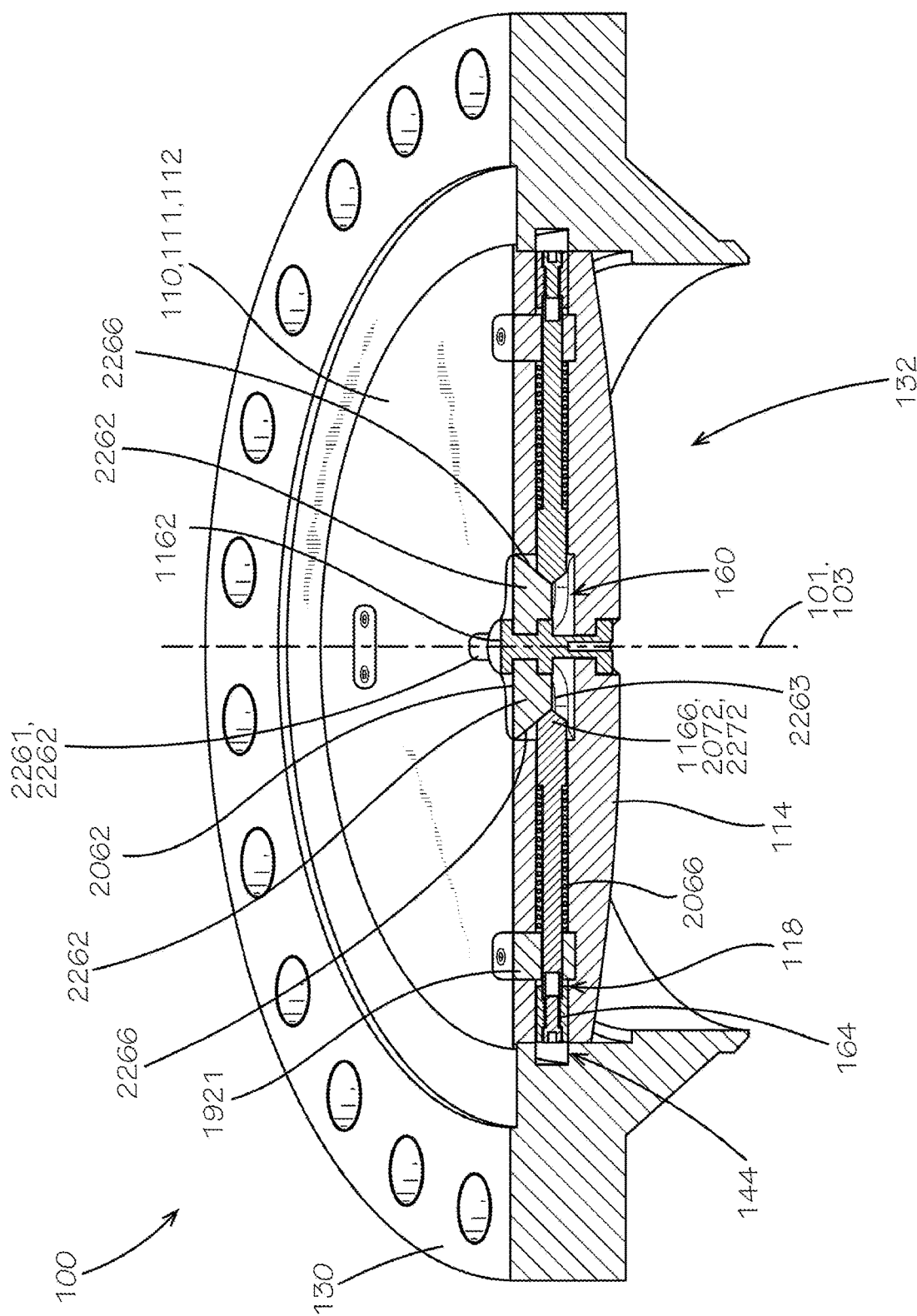
FIG. 22 is a cross-sectional view of the system of FIG. 19 with the plug positioned in the bore of the fitting and the locking mechanism positioned in the unlocked configuration.
Figure 23:
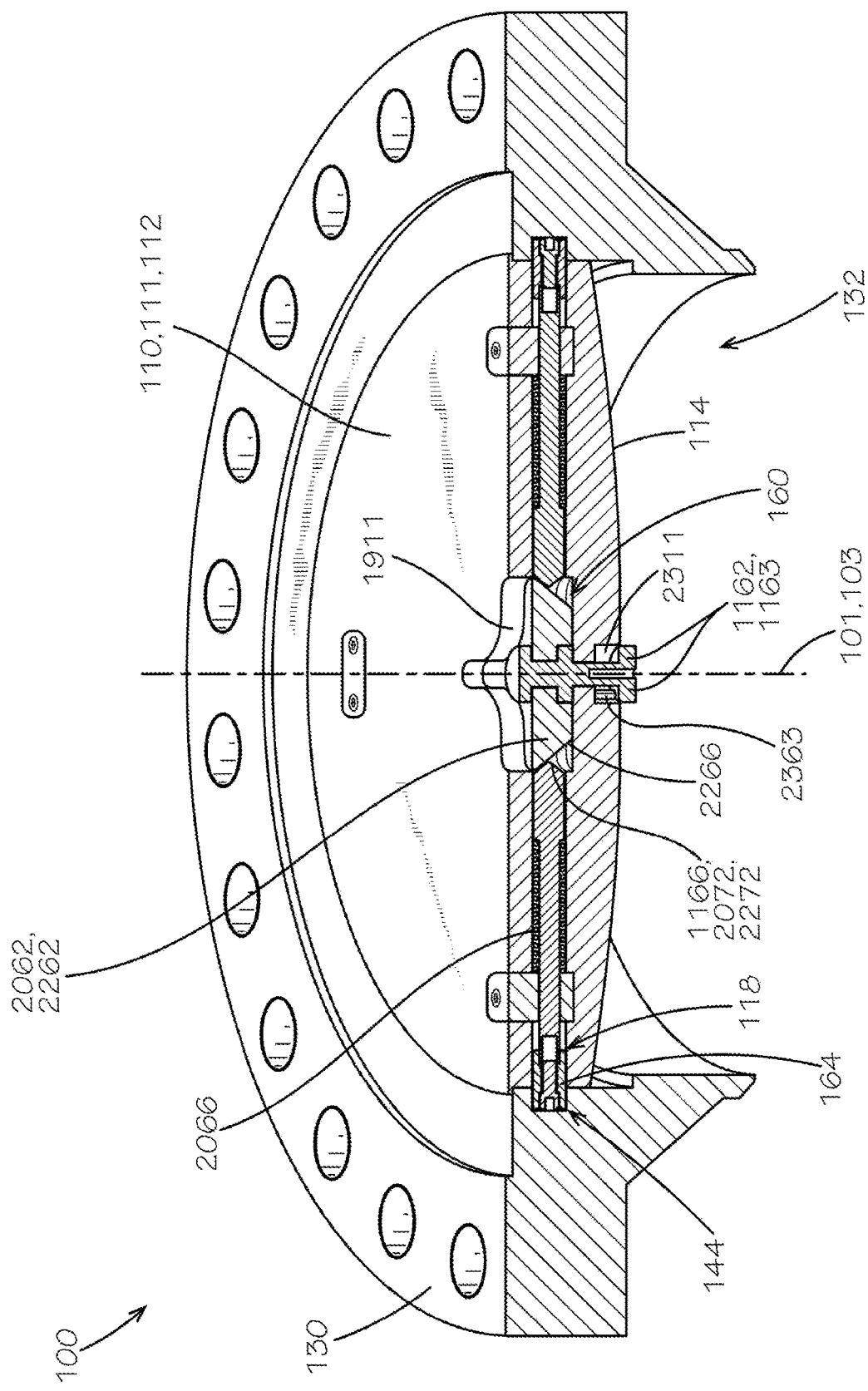
FIG. 23 is a cross-sectional view of the system of FIG. 19 with the plug positioned in the bore of the fitting and the locking mechanism positioned in the locked configuration.

FIGS. 22 and 23 are cross-sectional views of the system 100 taken along Line 22-22, shown in FIG. 19, but with the plug 110 positioned within the bore 132 of the fitting 130. FIG. 22 shows the locking mechanism 160 in the unlocked configuration. FIG. 23 shows the locking mechanism 160 in the locked configuration. The locking mechanism 160 can be reconfigured about and between the locking configuration and the unlocked configuration by sliding the center pin 1162 and/or driving member 2062 along the plug axis 101, which in turn can translate the locking bars 164 and the links 1166 radially inward relative to the plug axis 101. Specifically, the locking bars 164 and the links 1166 can linearly translate radially inward relative to the plug axis 101. More specifically, the locking bars 164 and the links 1166 can linearly translate in a radial direction that intersects the plug axis 101.

Turning to FIG. 22, in the unlocked configuration, the locking bars 164 can remain withdrawn into the plug recess 118 and disengaged from the fitting recess 144, as demonstrated by the left locking bar 164 and the left link 1166 with respect to the present viewing angle. Specifically, the biasing member 2066 can be compressed between the mounting block 1921 and the inner end 2072 of each link 1166, thereby driving the links 1166, and the locking bars 164 to which they are coupled, to their radially innermost position in the unlocked configuration, with respect to the plug axis 101. The inner ends 2072 can define contoured surfaces 2272, as demonstrated by the left link 1166 with respect to the present viewing angle. In some aspects, the contoured surfaces 2272 can be rounded, such as being shaped as a hemisphere, a dome, a cylindrical segment, a cone, a frustum, or any other suitable shape. In some aspects, the contoured surfaces 2272 can define flattened surfaces, such as a bevel, chamfer, pyramid, or other suitable shape.

The driving member 2062 can define one or more ramps 2266. In the aspect shown, the driving member 2062 can define four separate ridges 2262, each defining one of the ramps 2266. In some aspects, any of the ridges 2262 can define more than one ramp 2266. In some aspects, rather than separate ridges 2262, the driving member 2062 can be shaped as a cone, frustum of a cone, and a single ramp 2266 can be defined by a conical or frustoconical surface of the driving member 2062. In some aspects, rather than separate ridges 2262, the driving member 2062 can be shaped as a pyramid or truncated pyramid, and the ramps 2266 can be defined by substantially planar side surfaces of the driving member 2062.

The contoured surfaces 2272 can engage with the locking ramp(s) 2266 such that axial movement of the driving member 2062 can result in radial translation of the links 1166 and locking bars 164, relative to the plug axis 101. In the aspect shown, the center pin 1162 and/or the driving member 2062 can be positioned in its highest axial position along the plug axis 101, relative to the present viewing angle and the naming convention of the top body end 112 and the bottom body end 114, when the locking mechanism 160 is in the unlocked configuration. In the aspect shown, each ramp 2266 can extend radially outward as it extends axially upward, such that each ramp 2266 extends radially outwards farther near an axially upper end 2261 of the driving member 2062 than at an axially lower end 2263 of the driving member 2062. In the aspect shown, the center pin 1162 can protrude above the top body end 112 and/or the driving member 2062 can be positioned flush with the top body end 112 in the unlocked configuration; however, these positions should not be viewed as limiting.

In other aspects, this orientation can be reversed, and each ramp 2266 can extend radially inwards as it extends axially upward, such that each ramp 2266 extends radially outwards farther near the axially lower end 2263 of the driving member 2062 than at the axially upper end 2261 of the driving member 2062. In such aspects, the center pin 1162 and/or the driving member 2062 can be positioned in its lowest axial position along the plug axis 101, relative to the present viewing angle and the naming convention of the top body end 112 and the bottom body end 114, when the locking mechanism 160 is in the unlocked configuration.

Turning to FIG. 23, the locking mechanism 160 can be reconfigured to the locked configuration, shown, by axially moving the center pin 1162 and/or driving member 2062 along the plug axis 101. In the aspect shown, this can be accomplished by axially sliding the center pin 1162 and/or driving member 2062 downwards along the plug axis 101. In the aspect describe in the previous paragraph, this can be accomplished by axially sliding the center pin 1162 and/or driving member 2062 upwards along the plug axis 101.

The axial movement of the center pin 1162 and/or driving member 2062 can result in radially translating the locking bars 164 and the links 1166 outwards, as demonstrated by the left locking bar 164 and the left link 1166 with respect to the present viewing angle and the naming convention of the top body end 112 and the bottom body end 114, due to engagement between the inner end 2072 and the ridges 2262, and specifically the contoured surfaces 2272 with the ramps 2266. The biasing members 2066 can directly bias against the radially outward translation of the locking bars 164 and the links 1166 and can indirectly bias against the axial movement of the center pin 1162 and/or driving member 2062 towards the locked configuration. Accordingly, the biasing members 2066 can bias the locking mechanism 160 towards the unlocked configuration. To secure the locking mechanism 160 in the locked configuration, the locking lug(s) 1163 of the center pin 1162 can be engaged with one or more body locking lugs 2363 defined by the body 111 of the plug 110. In the present aspect, the center pin 1162 can be rotated while the locking mechanism 160 is in the locked configuration to engage and disengage the locking lug(s) 1163 from the body locking lug(s) 2363.

In the aspect shown, the body locking lug(s) 2363 can be positioned in a bottom cavity 2311, which can extend into the bottom body end 114 opposite from the center cavity 1911. In the aspect shown, the driving member 2062 can be bottomed out within the center cavity 1911 and positioned in facing engagement with the body 111 in the locked configuration.

In the locked configuration, the locking bars 164 can engage both the plug recess 118 and the fitting recess 144, thereby axially securing the plug 110 within the bore 132 of the fitting 130, relative to the fitting axis 103.

Figure 24:
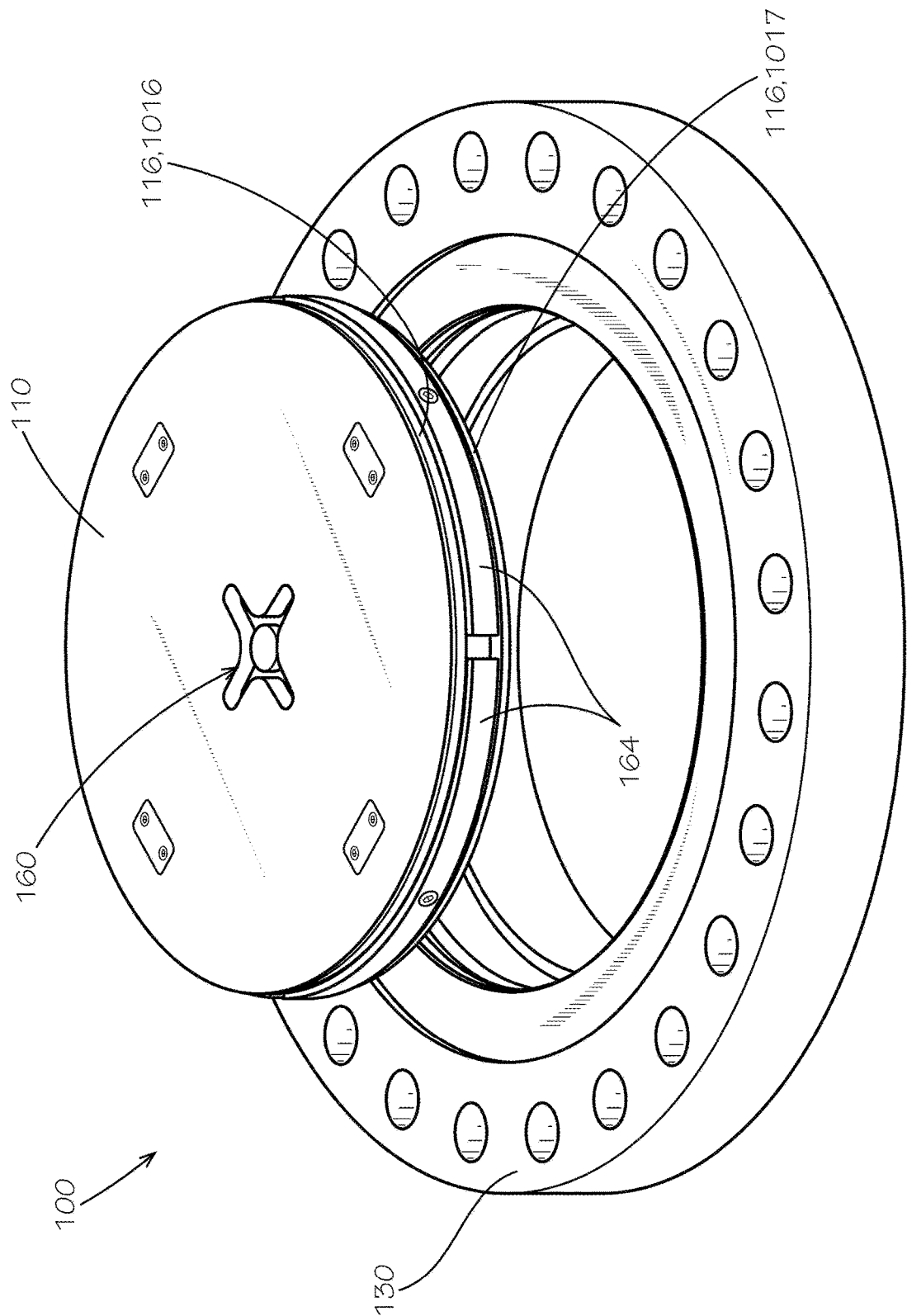
FIG. 24 is a perspective front view of the system of FIG. 19 with the plug positioned above the fitting and the locking mechanism positioned in the locked configuration.

FIG. 24 is a perspective view of the system 100 with the plug 110 shown positioned above the fitting 130 with the locking mechanism 160 shown in the locked configuration. As shown, the locking bars 164 can extend outwards from the upper portion 1016 and the lower portion 1017 of the outer surface 116 when the locking mechanism 160 is in the locked configuration.

Figure 25A:
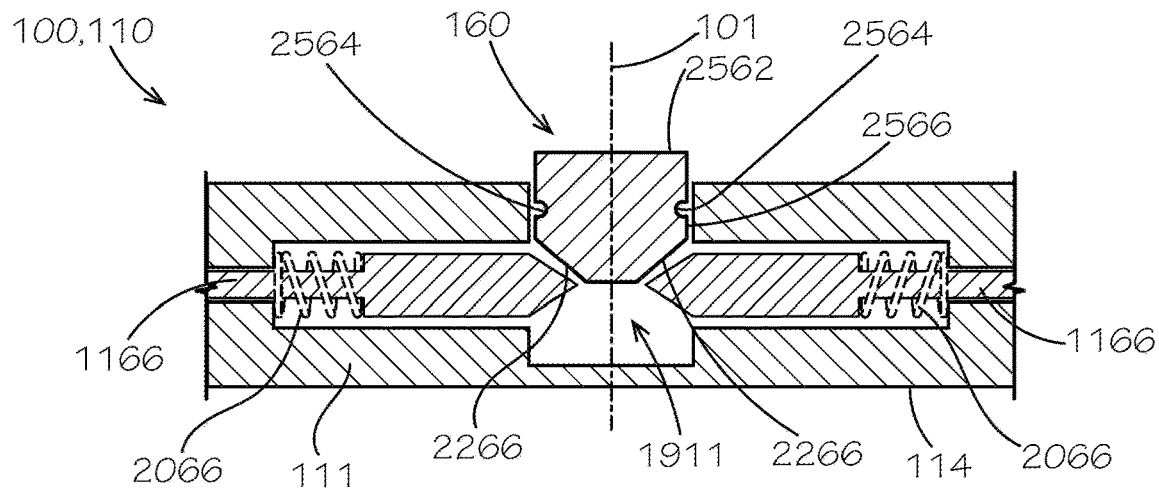
FIG. 25A is a cross-sectional detail view of another aspect of the body of the plug and a center pin of the system of FIG. 19 shown in a disengaged position, in accordance with another aspect of the present disclosure.
Figure 25B:
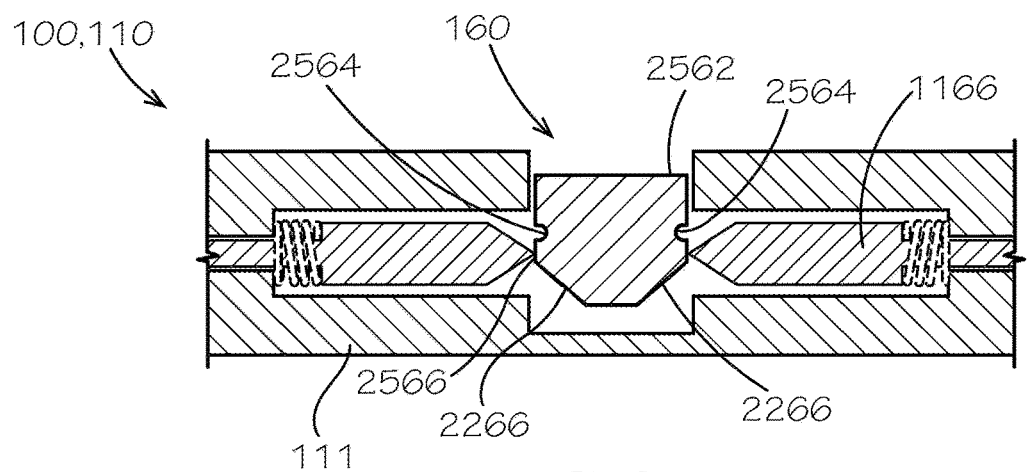
FIG. 25B is a cross-sectional detail view of another aspect of the body of the plug and the center pin of the system of FIG. 19 shown in an intermediate position, in accordance with another aspect of the present disclosure.
Figure 25C:
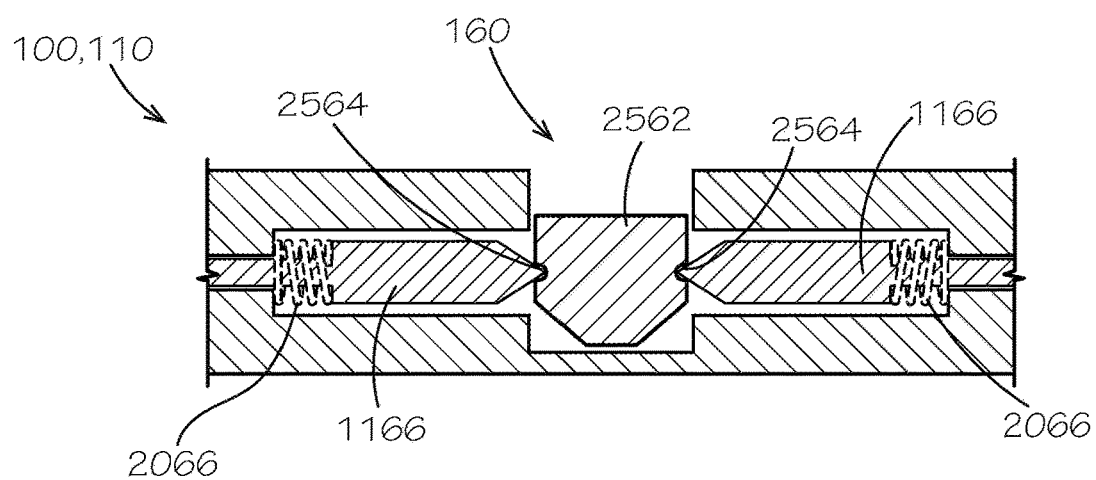
FIG. 25C is a cross-sectional detail view of another aspect of the body of the plug and the center pin of the system of FIG. 19 shown in an engaged position, in accordance with another aspect of the present disclosure.

FIGS. 25A-C show cross-sectional detail views of another aspect of the body 111 of the plug 110 and the center pin 2562 of the system 100 of FIG. 19, in accordance with another aspect of the present disclosure.

Turning to FIG. 25A, the ramp(s) 2266 can be defined by the center pin 2562. The center pin 2562 can define a single ramp, such as a conical or frustoconical surface extending circumferentially around the center pin 2562, or multiple ramps 2266, such as separate ramps 2266 defined by ridges, which can be similar to the ridges 2262 of FIG. 22, or cuts into the circumference of the center pin 2562, for example and without limitation. The center pin 2562 can define one or more retention depressions 2564. In some aspects, the center pin 2562 can define a single retention depression 2564, such as a groove extending circumferentially around the center pin 2562. In some aspects, the center pin 2562 can define a plurality of retention depressions 2564, such as holes or pockets, circumferentially spaced around the center pin 2562. The center pin 2562 can define a cylindrical surface 2566. In the present aspect, the cylindrical surface 2566 can be positioned at least partially between the ramp(s) 2266 and the retention depression(s) 2564. In the present aspect, a portion of the cylindrical surface 2566 can be positioned above the retention depression(s) 2564. The retention depression(s) 2564 can extend into the cylindrical surface 2566. In some aspects, the ramp(s) 2266 can extend to the retention depression(s) 2564.

In the aspect shown, the center cavity 1911 can be a blind hole, and the body 111 can enclose the center cavity 1911 at the bottom body end 114.

FIG. 25A shows the locking mechanism 160 in the unlocked configuration. In the present aspect, the center pin 2562 can be in a disengaged position when the locking mechanism 160 is in the unlocked configuration. In the unlocked configuration, the links 1166 can contact the center pin 2562 or be spaced apart from the center pin 2562, as shown. In some aspects, the links 1166 can contact the ramp(s) 2266 of the center pin 2562 in the unlocked configuration.

By driving the center pin 2562 downwards along the plug axis 101 towards the bottom body end 114, engagement between the ramp(s) 2266 and the links 1166 can drive the links 1166 and the locking lugs 164 (shown in FIG. 19) outwards towards the locked configuration. Depressing the center pin 2562 can overcome an inward biasing force on the links 1166 provided by the biasing members 2066 (shown in dashed lines).

FIG. 25B shows the center pin 2562 in an intermediate position, between the disengaged position and an engaged position, shown in FIG. 25C. In the intermediate position, the links 1166 can engage the center pin 2562 between the ramp(s) 2266 and the retention depression(s) 2564. In the present aspect, the links 1166 can engage the cylindrical surface 2566 when the center pin 2562 in the intermediate position. The locking mechanism 160 can be in the locked configuration when the center pin 2562 is in the intermediate position.

FIG. 25C shows the center pin 2562 in the engaged position. In the engaged position, the links 1166 can be aligned with the retention depression(s) 2564. The links 1166 can be driver radially inward by the biasing members 2066 to engage with the retention depression(s) 2564. Though the links 1166 and the locking lugs 164 (shown in FIG. 19) can be positioned slightly radially inward compared to when the center pin 2562 is in the intermediate position, the locking mechanism 160 can remain in the locked configuration because the locking lugs 164 can remain engaged with the plug 110 and the fitting 130 (shown in FIG. 19) when the center pin 2562 is in the engaged position and the plug 110 is positioned within the fitting 130.

With the links 1166 engaged with the retention depression(s) 2564 of the center pin 2562 under the force from the biasing members 2066, the links 1166 can act as a detent mechanism to resist movement of the center pin 2562 from the engaged position towards the disengaged position. The detent effect can prevent inadvertent unlocking of the locking mechanism 160, such as due to vibration or accidental contact with the center pin 2562.

Figure 26:
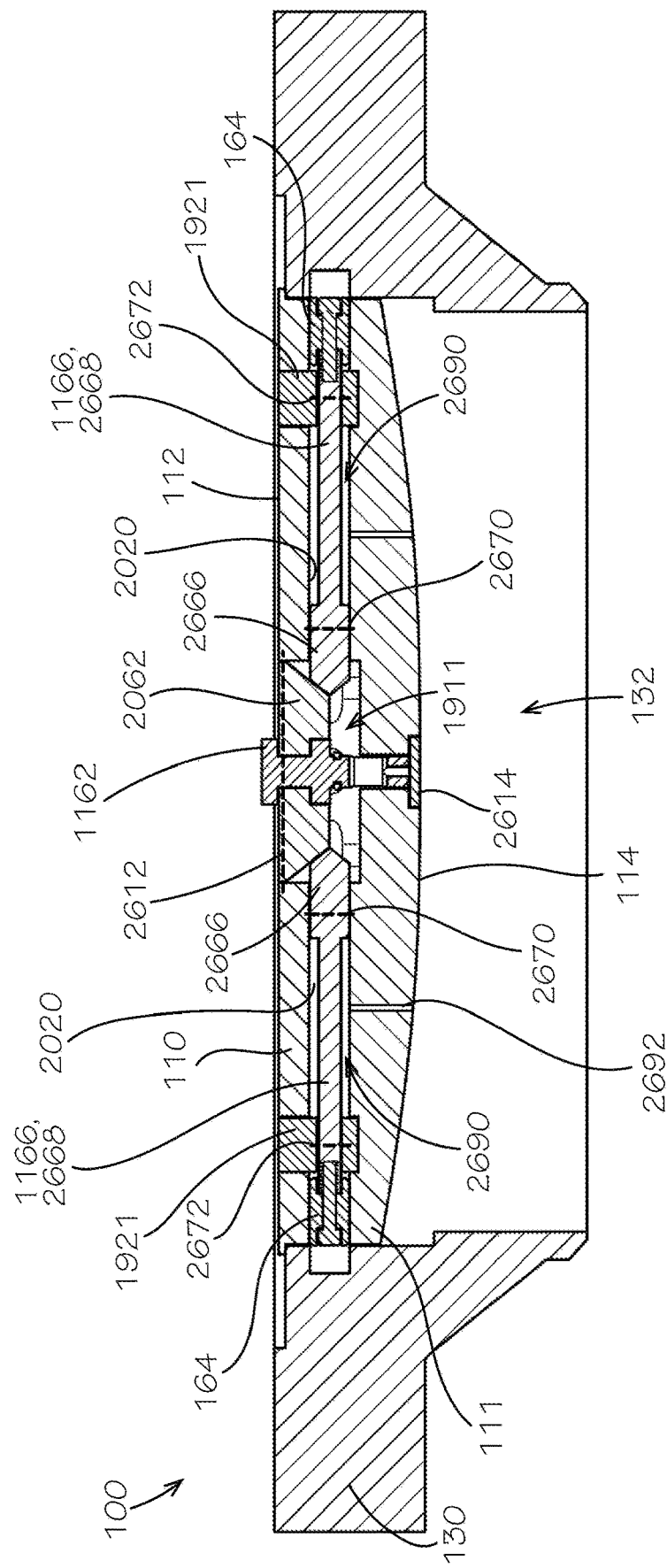
FIG. 26 is cross-sectional view of another aspect of the system of FIG. 19 in accordance with another aspect of the present disclosure.

FIG. 26 is cross-sectional view of another aspect of the system 100 of FIG. 19, wherein the plug 110 can further comprise a top seal 2612 (shown in dashed lines), a bottom seal 2614, a plurality of inner link seals 2670 (shown in dashed lines), and a plurality of outer link seals 2672 (shown in dashed lines) in accordance with another aspect of the present disclosure. In the aspect shown, the biasing members 2066 (shown in FIG. 20) can optionally be omitted. The links 1166 can each define an inner head 2666 and a shaft 2668. The shaft 2668 can be smaller in diameter than the inner head 2666. The inner heads 2666 can be closely fit within the respective channels 2020. The inner link seals 2670 can form seals between the inner heads 2666 and the respective channels 2020. The shafts 2668 can be closely fit within the mounting blocks 1921. The outer link seals 2672 can form seals between the shafts 2668 and the respective mounting blocks 1921. A portion of each channel 2020 positioned between the respective inner head 2666 and the respective mounting block 1921 can be a piston chamber 2690. The body 111 of the plug 110 can define a port bore 2692 extending between the bottom body end 114 and each piston chamber 2690.

The top seal 2612 can form a seal within the center cavity 1911 between the driving member 2062 and the body 111 near the top body end 112. The bottom seal 2614 can form a seal at the bottom body end 114, which can enclose the bottom cavity 2311 (shown in FIG. 23). The top seal 2612, the bottom seal 2614, and the inner link seals 2670 can together seal the center cavity 1911 and the bottom cavity 2311. In some aspects, the center cavity 1911 and the bottom cavity 2311 can be maintained at atmospheric pressure.

The port bores 2692 can connect the piston chambers 2690 to the bore 132 of the fitting 130. When the plug 110 is positioned within the fitting 130, and the locking mechanism 160 is in the locked configuration, the bore 132 of the fitting 130 can be pressurized. Pressurized fluids from the bore 132, such as gases or liquids, can enter the piston chambers 2690 through the port bores 2692 and pressurize the piston chambers 2690 to a higher pressure than that of the center cavity 1911 and the bottom cavity 2311. This pressure differential across the inner heads 2666 can bias the links 1166, and the locking mechanism 160 towards the unlocked configuration (shown). As similarly described above with respect to FIG. 23, engagement between the center pin 1162 and the body 111 can secure the locking mechanism 160 in the locked position. Once the center pin 1162 is disengaged from the body locking lugs 2363 (shown in FIG. 23), the biasing force from the pressure differential can reconfigure the locking mechanism 160 from the locked configuration to the unlocked configuration (shown) by retracting the links 1166 and the locking bars 164. The operation can be similar to a gas or hydraulic spring and can be used in place of or in cooperation with the biasing members 2066 (shown in FIG. 20) in various aspects.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That is which is claimed is:

1. A plug comprising:
    a body defining a plug axis extending from a top body end to a bottom body end, the body defining an outer surface extending between the top body end and the bottom body end and a plug recess extending into the body from the outer surface; and
    a locking mechanism comprising a plurality of locking bars and a driving member coupled to the plurality of locking bars, the plurality of locking bars rotationally fixed relative to the body, the driving member movable parallel to the plug axis, the locking mechanism configured to move the locking bars from an unlocked configuration to a locked configuration, wherein:
    in the unlocked configuration:
        the plurality of locking bars comprises a first locking bar that contacts a second locking bar to form an unbroken circular shape; and
        the plurality of locking bars are positioned at least partially within the plug recess and radially inward from the outer surface; and
    in the locked configuration:
        a portion of the plurality of locking bars extends radially outward beyond the outer surface.

2. The plug of claim 1, wherein the plurality of locking bars are translatable relative to the body to reconfigure the locking mechanism between the locked configuration and the unlocked configuration.

3. The plug of claim 1, wherein the plurality of locking bars are translatable in a radial direction relative to the plug axis to reconfigure the locking mechanism between the locked configuration and the unlocked configuration.

4. The plug of claim 3, wherein:
    the locking mechanism further comprises a link coupled to the plurality of locking bars;
    the plurality of locking bars are rotationally fixed to the link; and
    the link is translatable in the radial direction.

5. The plug of claim 1, wherein the plurality of locking bars are coupled to the driving member by a plurality of links, and wherein the plurality of links are rotationally fixed to the plurality of locking bars.

6. The plug of claim 1, wherein the locking mechanism is configured to move the locking bars from the locked configuration to the unlocked configuration.

7. The plug of claim 1, further comprising a sealing groove extending circumferentially around the body of the plug, the sealing groove comprising a sealing member positioned below the plug recess.

8. The plug of claim 1, wherein the locking mechanism is configured to move from the unlocked configuration to the locked configuration, and wherein when the locking mechanism is moved from the unlocked configuration to the locked configuration at least one locking bar moves from the unlocked configuration to the locked configuration.

* * * * *